(12) United States Patent
Wang et al.

(10) Patent No.: US 7,139,005 B2
(45) Date of Patent: Nov. 21, 2006

(54) OPTIMIZED FIXED-POINT MATHEMATICAL LIBRARY AND GRAPHICS FUNCTIONS FOR A SOFTWARE-IMPLEMENTED GRAPHICS RENDERING SYSTEM AND METHOD USING A NORMALIZED HOMOGENOUS COORDINATE SYSTEM

(75) Inventors: Lifeng Wang, Beijing (CN); Ke Deng, Beijing (CN); Baining Guo, Beijing (CN); Joshua William Buckman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 109 days.

(21) Appl. No.: 10/661,055

(22) Filed: Sep. 13, 2003

(65) Prior Publication Data

US 2005/0062762 A1 Mar. 24, 2005

(51) Int. Cl.
*G09G 5/00* (2006.01)
*G06T 115/50* (2006.01)
(52) U.S. Cl. .............. 345/643; 345/581; 345/426
(58) Field of Classification Search .......... 345/643, 345/418, 419, 421, 422, 546, 426, 581
See application file for complete search history.

(56) References Cited

U.S. PATENT DOCUMENTS

| | | | |
|---|---|---|---|
| 5,388,206 A * | 2/1995 | Poulton et al. ........... 345/505 |
| 5,856,829 A * | 1/1999 | Gray et al. ............... 345/422 |
| 6,115,047 A * | 9/2000 | Deering .................... 345/422 |
| 6,169,554 B1 * | 1/2001 | Deering .................... 715/764 |
| 6,285,779 B1 * | 9/2001 | Lapidous et al. ......... 382/106 |
| 6,559,856 B1 * | 5/2003 | Fossum et al. ........... 345/600 |
| 6,597,363 B1 * | 7/2003 | Duluk et al. .............. 345/506 |
| 6,606,097 B1 * | 8/2003 | Fossum .................... 345/501 |
| 6,734,874 B1 * | 5/2004 | Lindholm et al. ........ 345/643 |
| 6,774,895 B1 * | 8/2004 | Papakipos et al. ....... 345/422 |
| 2002/0075285 A1 * | 6/2002 | Morrison ................... 345/660 |
| 2002/0171644 A1 * | 11/2002 | Reshetov et al. ......... 345/420 |
| 2004/0138560 A1 * | 7/2004 | Paladini .................... 600/437 |
| 2004/0145589 A1 * | 7/2004 | Prokopenko et al. .... 345/581 |

\* cited by examiner

*Primary Examiner*—Ryan Yang
(74) *Attorney, Agent, or Firm*—Lyon & Harr, L.L.P.; Craig S. Fischer

(57) ABSTRACT

A software-implemented graphics rendering system and method designed and optimized for embedded devices (such as mobile computing devices) using fixed-point operations including a variable-length fixed point representation for numbers and a normalized homogenous coordinates system for vector operations. The graphics rendering system and method includes a fixed-point mathematics library and graphics functions that includes optimized basic functions such as addition, subtraction, multiplication, division, all vertex operations, matrix operations, transform functions and lighting functions, and graphics functions. The mathematical library and graphics functions are modified and optimized by using a variable-length fixed-point representation and a normalized homogenous coordinate system (NHCS) for vector operations.

37 Claims, 8 Drawing Sheets

OPTIMIZED FIXED-POINT MATHEMATICAL LIBRARY AND GRAPHICS FUNCTIONS FOR A SOFTWARE-IMPLEMENTED GRAPHICS RENDERING SYSTEM AND METHOD USING A NORMALIZED HOMOGENOUS COORDINATE SYSTEM

TECHNICAL FIELD

The present invention relates in general to graphics rendering and more particularly to a software-implemented graphics rendering system and method designed and optimized for embedded devices (such as mobile computing devices) using fixed-point operations including a variable-length fixed point representation for numbers and a normalized homogenous coordinates system for vector operations.

BACKGROUND OF THE INVENTION

The importance of three-dimensional (3D) enabled embedded platforms has become increasingly important due to users' expectations of multimedia-rich environments in products ranging from DVD players, set-top boxes, Web pads and mobile computing device (including handheld computing devices) to navigational equipment and medical instrumentation. The importance of 3D rendering is manifested in its ability to provide users with greater and more detailed visual information. As users continue to expect equal or nearly equal graphics quality on embedded devices as on their desktop systems, applications designed to run on embedded platforms continue to converge with their desktop equivalents. Thus, the need for 3D graphics rendering is vital in today's embedded systems.

One of the more popular 3D rendering standards available today is Direct3D by Microsoft® Corporation. Direct 3D is an application programming interface (API) for manipulating and displaying 3D objects. Direct3D provide programmers and developers with a way to develop 3D applications that can utilize whatever graphics acceleration hardware is installed on the system. Direct3D does an excellent job in supporting efficient rendering in desktop applications. These desktop systems typically have powerful central processing units (CPUs), math coprocessors, and graphics processing units (GPUs).

Typical graphic rendering standards (such as Direct3D) are implemented using floating-point operations (such as transform and lighting). In embedded systems, the CPUs may not be powerful enough to support floating-point operations and they typically have no coprocessors or GPUs for accelerating the floating-point operations. Moreover, the graphics technology in these embedded platforms generally do not enable a number of key 3D graphics technologies (such as a vertex shader, a pixel shader, and vertex blending) that are required in applications designed for desktop systems. Thus, moving these rendering standards that work well on desktop systems directly to embedded platforms is not feasible because of the lack of powerful hardware and processing power on embedded systems.

One technique used to overcome the hardware problem in embedded systems is to integrate the graphics rendering into software. However, floating-point software routines are notoriously slow. Moreover, floating-point operations are expensive and require large amounts of memory and have a large code size. Thus, using floating-point operations in software-implemented graphics rendering is in impractical on an embedded platform. Therefore, there exists a need for a graphics rendering system that is optimized for operation on an embedded platform. Moreover, there is a need for a graphics rendering system that is software-implemented such that powerful hardware and processing power is not required. There is also so need for a software-implemented graphics rendering system to be fast, efficient require less memory and have a small code size such that the graphics rendering system is ideal for embedded platforms.

SUMMARY OF THE INVENTION

The invention disclosed herein includes a graphics rendering system and method that is optimized for use on embedded platforms (such as mobile computing devices). The graphics rendering system and method are software implemented and do not require powerful graphics and processing hardware. Moreover, the graphics rendering system and method use fixed-point operations instead of floating-point operations for renderings. Using fixed-point operations is much faster and more efficient than floating-point operations. In addition, fixed-point operations may be performed efficiently on less powerful processors that support only integer mathematics. This means that the graphics rendering system and method is optimized for embedded platforms and is faster, more efficient, requires less memory and has a smaller code size than graphics rendering system for desktop systems.

The graphics rendering system and method includes a fixed-point mathematics library and graphics functions that enable efficient graphics rendering in embedded devices. The fixed-point mathematics library and graphics functions are generated considering the efficiency, resolution, CPU and memory of the embedded device. The fixed-point mathematics library includes optimized basic functions such as addition, subtraction, multiplication, division, all vertex operations, matrix operations, transform functions and lighting functions, and graphics functions. The data structure definition, mathematical operations, and graphics functions are optimized for embedded platforms. The mathematical library and graphics functions are modified and optimized by using a variable-length fixed-point representation and a normalized homogenous coordinate system (NHCS) for vector operations. Using NHCS solves the fixed-point overflow problem. The graphics rendering system and method achieves a higher efficiency using software rendering and fixed-point NHCS representation without graphics hardware than traditional floating-point rendering with powerful graphics hardware.

The NHCS graphics rendering method disclosed herein includes inputting rendering data in a floating-point format, fixed-point format, or both. The rendering data then is converted into a variable-length fixed-point format having a normalized homogenous coordinate system (NHCS). This converts the input rendering data into a NHCS fixed-point format. The NHCS fixed-point format allows computations and operations to be performed on the converted rendering data such that a range can be predicted. Any data outside of the range is truncated. This processing of the data in the NHCS fixed-point format allows more efficient use of valuable memory and processing power. A NCHS fixed-point data structure then is defined to characterize the converted rendering data and fixed-point math library is used to process the rendering data in the NHCS fixed-point data structure. The math library includes mathematical operations and graphics functions. The processed rendering data then is ready for rendering by a rendering engine.

Conversion of the input rendering data into a NHCS fixed-point format is performed as follows. First, values are input and a maximum value is determined from among all of the input data. Next, a maximum fixed-point buffer size for a destination buffer is determined. Next, the maximum value is scaled to the maximum fixed-point buffer size and the number of digits that the value is shifted is recorded. Using this shift digit, the remainder of the values is normalized and the output is the input rendering data in a NHCS fixed-point format.

The NHCS graphics rendering system disclosed herein includes a task module, an application program interface (API) module, and a driver module. The task module inputs raw rendering data and converts the data into a desired fixed-point format. In some embodiments, the task module is capable of converting the input rendering data into either a traditional fixed-point format or a preferred NHCS fixed-point format. The API module creates buffers for storing the converted data. In addition, the API module prepares a command buffer for the driver module. The driver module contains mathematical operations and graphics functions to prepare the data for rendering. The data is in a fixed-point format (preferably a NHCS fixed-point format) and the mathematical operation and graphics functions are specially created to process the fixed-point data. The output is the processed rendering data that is ready to be rendered by a rendering engine.

The task module includes a math library and translator that converts input rendering data and performs preliminary mathematical operations on the converted data. In addition, the math library and translator defines a specific data structure for the converted data. The API module includes an index buffer for storing indices and a vertex buffer for storing vertex information. The API module also includes a wrapper that packages commands and provides convenience, compatibility and security for the commands. This ensures that the commands are ready for the driver module. A command buffer residing on the API module stores the wrapper prior to the commands being sent to the driver module.

The driver module prepares data for the raster translating the data into the language of the computing device's graphics hardware. The driver module includes a transform and lighting (T&L) module and a rasterizer. The T&L module includes all necessary mathematical operations and graphic functions in a NHCS fixed-point data format for processing the converted rendering data. The rasterizer prepares the processed rendering data to be sent to the raster.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. General Overview

Embedded platforms (such as mobile computing devices) often have hardware that does not support intensive graphics rendering. In particular, a mobile computing device may have a central processing unit (CPU) with limited processing power and lack a coprocessor or graphics processing unit (GPU). This type of hardware that is found on most mobile computing devices typically will not support floating-point operations that are commonly used in graphics rendering. This severely limits the usefulness and desirability of mobile computing devices.

The NHCS graphics rendering system and method disclosed herein is implemented in software and uses a fixed-point representation of numbers instead of traditional floating-point representation. Using a fixed-point representation is a much faster way to perform mathematical operations and can easily be optimized for use on a mobile computing device. The NHCS graphics rendering system and method disclosed herein includes an optimized fixed-point math library that enables efficient and fast graphics rendering in embedded devices. The math library includes fixed-point mathematical operations and graphics functions. The data structure, mathematical operations, and graphics functions are optimized for embedded platform by using a variable-length fixed-point representation and a normalized homogenous coordinates system (NHCS) for vector operations. The NHCS graphics rendering system and method is software-based and can easily be implemented into existing mobile computing devices without hardware modification.

Figure 1:
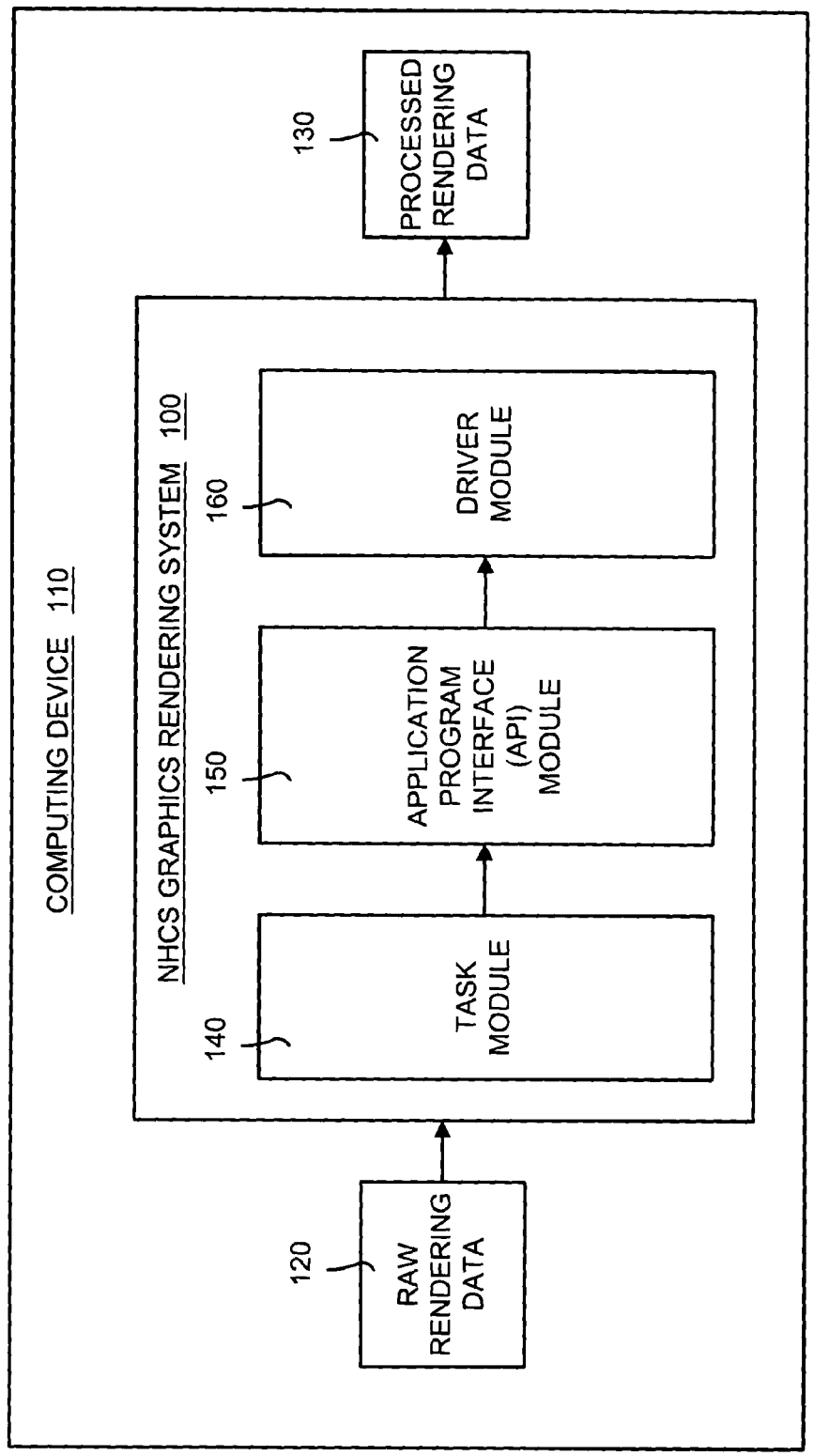
FIG. 1 is a block diagram illustrating a general overview of the normalized homogenous coordinate system (NHCS) graphics rendering system disclosed herein.

FIG. 1 is a block diagram illustrating a general overview of the NHCS graphics rendering system 100 disclosed herein. The system 100 typically resides on a computing device 110, such as a mobile computing device. In general, the system 100 inputs raw rendering data 120, processes the data 120 and outputs processed rendering data 130 suitable for rendering by a rendering engine (not shown). The raw rendering data 120 typically is in a floating-point format.

As shown in FIG. 1, the NHCS graphics rendering system 100 includes a task module 140, an application program interface (API) module 150, and a driver module 160. The task module 140 inputs the raw rendering data 120 in a floating-point format and converts the data 120 into a desired fixed-point format. In some embodiments, the task module 140 is capable of converting the data 120 in a floating-point format into either a traditional fixed-point format or a preferred NHCS fixed-point format. The converted data then is sent to the API module 150. The API module 150 creates buffers for storing the converted data. In addition, the API module 150 prepares a command buffer for the driver module 160. The driver module 160 contains the mathematical operation and graphics functions to prepare the data for rendering. The data is in a fixed-point format (preferably a NHCS fixed-point format) and the mathematical operation and graphics functions are specially created to process the fixed-point data. The output is the processed rendering data 130 that is ready to be rendered by a rendering engine.

II. Exemplary Operating Environment

The NHCS graphics rendering system and method disclosed herein is designed to operate in a computing environment. The following discussion is intended to provide a brief, general description of a suitable computing environment in which the NHCS graphics rendering system and method may be implemented.

Figure 2:
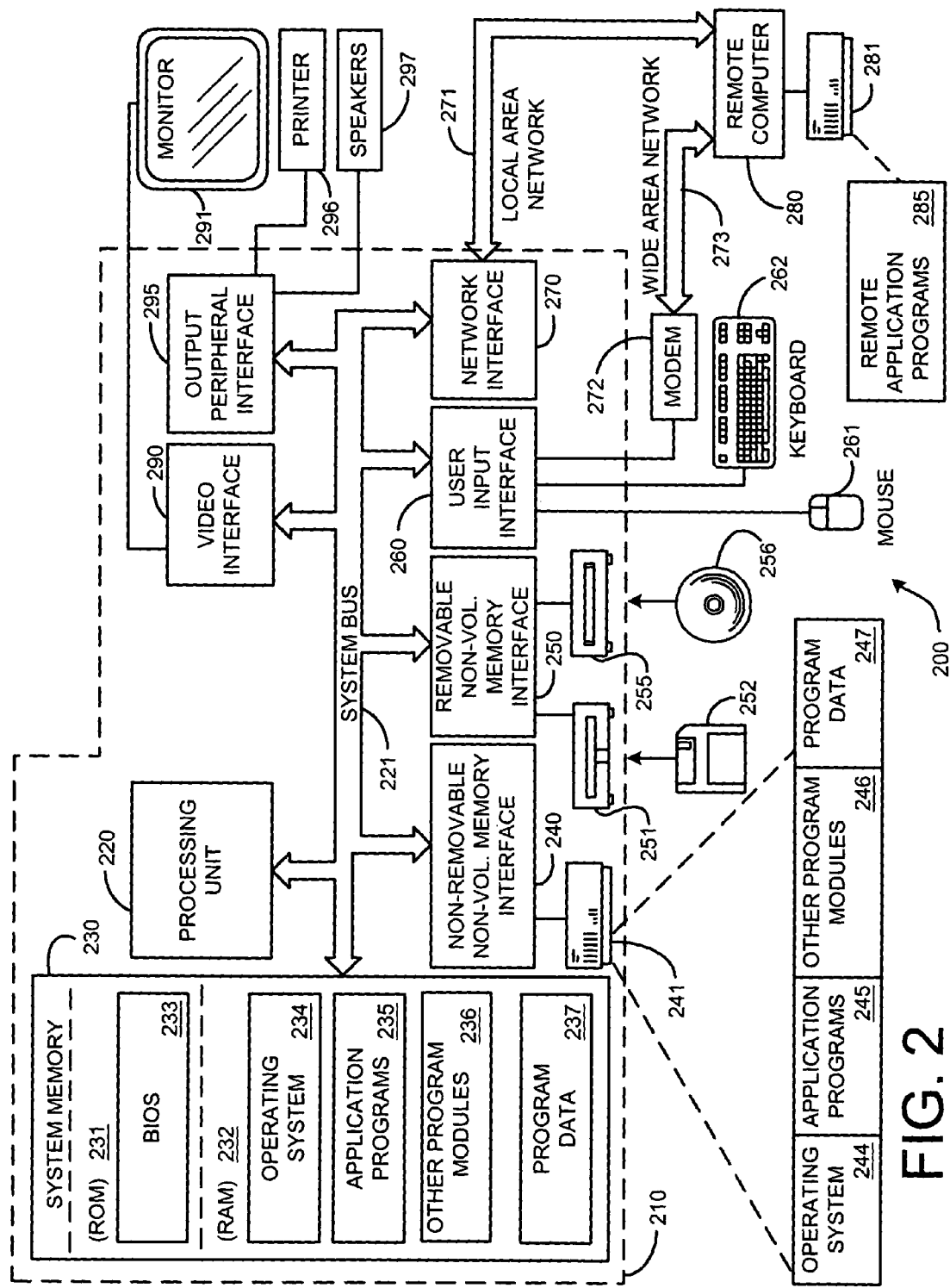
FIG. 2 illustrates an example of a suitable computing system environment in which the NHCS graphics rendering system and method may be implemented.

FIG. 2 illustrates an example of a suitable computing system environment 200 in which the NHCS graphics rendering system and method may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The NHCS graphics rendering system and method is operational with numerous other general purpose or special purpose computing system environments or configurations. Examples of well known computing systems, environments, and/or configurations that may be suitable for use with the NHCS graphics rendering system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The NHCS graphics rendering system and method may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 2, an exemplary system for implementing the NHCS graphics rendering system and method includes a general-purpose computing device in the form of a computer 210 (the computer 210 is an example of the computing device 110 shown in FIG. 1).

Components of the computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 210 typically includes a variety of computer readable media. Computer readable media can be any available media that can be accessed by the computer 210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 210. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within the computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 220 through a user input interface 260 that is coupled to the system bus 221, but may be connected by other interface and bus structures, such as, for example, a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

III. System Components

Figure 3:
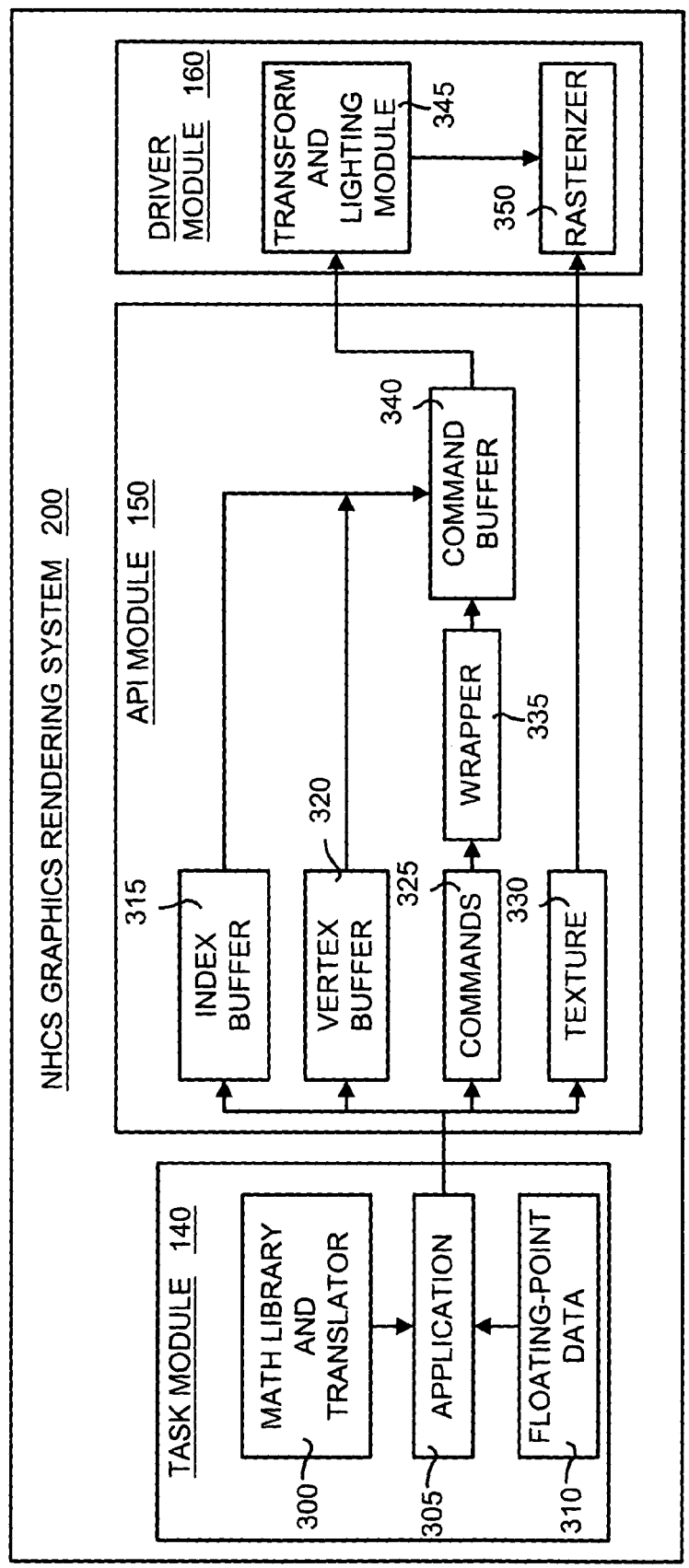
FIG. 3 is a block diagram illustrating the details of an exemplary implementation of the NHCS graphics rendering system shown in FIG. 1.

FIG. 3 is a block diagram illustrating the details of an exemplary implementation of the NHCS graphics rendering system 100 shown in FIG. 1. In this exemplary implementation, the NHCS graphics rendering system 100 is implemented in a Direct3D mobile environment. Microsoft® Corporation in Redmond, Wash., developed Direct3D (D3D) and it has become a rendering standard. Traditionally, D3D supports efficient rendering in desktop personal computer (PC) applications. These PCs typically have powerful CPUs and GPUs and can support intensive graphics rendering. For other embedded devices, such as mobile computing devices, D3D dos not fit because it needs powerful processing units. The NHCS graphics rendering system and method disclosed herein enables the use of D3D on mobile computing devices (D3DM). The NHCS graphics rendering system and method includes powerful software-based fixed-point mathematical library and corresponding graphics functions. The mathematical library is optimized for use on mobile computing devices and makes efficient use of the limited resources available on mobile computing devices. The data structure definition, mathematical operations, and graphics functions are specially designed and optimized for D3DM by using variable-length fixed-point representation and NHCS for vector operations.

The basic structure of D3DM is that there is a "thin" API module and a "thick" driver module. In the thin API module, the interface is simple and straightforward. Thus, the API code provides integration with the operating system and hosting for the display driver, but does not provide any actual drawing code. In the thick driver module, most of the work is forwarded by the API module and performed in the driver module. Thus, the thick driver module includes drawing code, which may only be overridden by the display driver.

The design of D3DM is based on the fact that models can be described in terms of primitives. In turn, each primitive is described in terms of a plurality of vertexes (or vertices). A vertex is the point at which two lines meet. The vertex carries a great of information. For example, the vertex contains the 3-D coordinates and weight. In addition, there is color information, often specified in the form of a diffuse and a specular color. This color data is commonly coded in the "RGBA" format (for red, green, blue and alpha). The vertex also contains a normal, the vector that is orthogonal to its surface, and the texture coordinates that represent the texture and its position for the vertex. The vertex may have several texture coordinates in case more than one texture is applied to the vertex. Further, the vertex may contain texture fog as well as other information such as point size. Thus, the vertex, the smallest unit in a 3-D scene, contains a large amount of information.

D3DM loads this data for the vertices into vertex buffers. The data then is processed by a transform and lighting (T&L) pipeline where the output is pixel color values for a frame buffer. The NHCS graphics rendering system and method contains a mathematical library that is used by D3DM for two purposes. First, the mathematical library is used to translate floating-point data into a NHCS fixed-point format and perform some necessary mathematical operations. Second, the mathematical library is used to implement the transform and lighting. The D3DM drivers expose all of the features of the mobile computing device on which an application is running, thus achieving maximum drawing performance.

Referring to FIG. 3, the task module 140 includes a math library and translator 300, an application 305, and floating-point data 310. In general, the task module 140 inputs the floating-point data 310 and converts the data 310 into a fixed-point format or a NHCS fixed-point format. The converted data then is sent to buffers created by the API module 150. The math library and translator 300 converts the data 310 and performs preliminary mathematical operations on the converted data. In addition, the math library and translator 300 defines a specific data structure for the converted data. The preliminary mathematical operations and data structure definitions are discussed in detail below.

The API module 150 creates buffers for storing the converted data and preparing the data for the driver module 160. The API module 150 includes an index buffer 315, for storing indices, and a vertex buffer 320, for storing vertex information. The index buffer holds a value for each vertex. The value is called an index. Indices are used to retrieve a vertex in the vertex buffer. Each index is an offset in the current vertex buffer of the data for this vertex. This allows for the sharing of vertex data between multiple vertices and avoids the duplicated storage of vertices when two neighboring triangles share vertices. The API module 150 also includes commands 325 that provide instructions for the rendering and texture 330 that provides texture information. The API module 150 includes a wrapper 335 that packages the commands 325 and provides convenience, compatibility and security for the commands 325. This ensures the that the commands 325 are ready for the driver module 160. A command buffer 340 stores the wrapper 335 prior to them being sent to the driver module 160.

The driver module 160 prepares data for the raster. In addition, the driver module 160 prepares the data for use by a rendering engine. This means that the data is translated into the language of the computing device's graphics hardware and causes particular primitives to be drawn. The driver module 160 includes a transform and lighting (T&L) module 345 and a rasterizer 350. The T&L module 345 includes all necessary mathematical operations and graphic functions in the NHCS fixed-point data format. These mathematical operations and graphic functions are discussed in detail below. The rasterizer prepares the rendering data to be sent to the raster.

IV. Components Details

As stated above, the math library and translator 300 converts the data 310 and performs preliminary mathematical operations on the converted data. In addition, the math library and translator 300 defines a specific data structure for the converted data. The basic mathematical operations of fixed-point data, the NHCS fixed-point format, and the data structure definitions of the math library and translator 300 now will be addressed.

Fixed Point Mathematical Operations

The basic mathematical operations performed by the math library and translator module 300 include addition (+), subtraction (−), multiplication (×) and division (/). Each of these basic functions is optimized to achieve more efficiently in software rendering than can be had with traditional floating point rendering with graphics hardware. Each of these optimized basic mathematical operations will now be discussed.

Addition

Most central processing units (CPUs) designed for mobile computing devices support integer addition. For example, CPUs designed for use with D3DM support integer addition. When adding two fixed-point numbers having the same bits of mantissa, integer addition can be used. However, care is required to avoid the overflow problem. In addition, care must also be used when adding signed and unsigned fixed-point data.

The basic algorithm of the addition of fixed-point numbers assumes that operand A and operand B are in both fixed-point data with m-bit mantissa. In this situation, $C=A+B$ will also be fixed-point data with m-bit mantissa. It should be noted that overflow is possible in fixed-point addition.

Overflow in a signed integer is different from overflow in an unsigned integer. By way of example, given two unsigned 32-bit integer, $0 \times 7FFFFFFF + 0 \times 7FFFFFFF = 0 \times FFFF\ FFFE$ there is no overflow. However, if the same data is added as signed 32-bit integer, overflow occurs in the sign bit. Most compilers can distinguish signed integer from a unsigned integer, so there typically is no need to address this situation. However, when writing in assembler language, code or programs (ASM), the difference between signed and unsigned must be taken into account.

The addition of signed and unsigned data is only appropriate when the signed operand is positive. The result can be saved as a signed or unsigned number, as long as no overflow occurs. The addition of different bit integers requires alignment. For example, when adding a 32-bit integer with a 16-bit integer, the 16-bit integer must be aligned to the 32-bit integer. Given that mantissa bits in operands are the same, the addition will be correct. It should be noted that when coding in C++ the C++ compiler will automatically perform the alignments, but when coding using ASM the need for alignment must be recognized.

Addition results larger than the maximum or less than the minimum will cause an overflow. The mathematical operations of the NHCS graphics rendering system 100 will not deal with overflow for performance consideration. In such cases, the operand can be pre-shifted before adding to avoid overflow. In a working example of the NHCS graphics rendering system 100, the following are the maximum and minimums:

For 32-bits signed integer, the maximum is 0×7FFF FFFF, and the minimum is 0×8000 0000.

For 32-bits unsigned integer, the maximum is 0×FFFF FFFF, and the minimum is 0×0000 0000.

Subtraction

Integer subtraction is supported on mobile computing devices using D3DM. Integer subtraction can be used when subtracting two fixed-point data with the same bits of mantissa. Once again, care is required to avoid the overflow problem. Moreover, care must also be used when subtracting signed and unsigned fixed-point data.

The basic algorithm of the subtraction of fixed-point numbers assumes that operand A and operand B are in both fixed-point data with m-bit mantissa. In this situation, $$C=A-B$$

is also fixed-point data with m-bit mantissa. Overflow also is possible in subtraction.

Subtraction results larger than the maximum or less than the minimum will cause an overflow. The NHCS graphic rendering system 100 does not deal with overflow for performance consideration. In such cases, the operand is pre-shifted before subtracting to avoid overflow. In a working example of the NHCS graphics rendering system 100, the following are the maximum and minimums:

For 32-bits signed integer, the maximum is 0×7FFF FFFF, and the minimum is 0×8000 0000.

For 32-bits unsigned integer, the maximum is 0×FFFF FFFF, and the minimum is 0×0000 0000.

Multiplication

Integer multiplication also is supported on mobile computing devices using D3DM. When multiplying two fixed-point numbers, the intermediate result is stored in double buffer. Overflow may appear when the double buffer is truncated to a single buffer.

The basic algorithm of the multiplication of fixed-point numbers assumes that operand A is a n-bit fixed point data with a-bit mantissa, and operand B is a n-bit fixed point data with b-bit mantissa. In this situation, $$C=A\times B$$

is a 2n-bit fixed point data with (a+b)-bit mantissa.

Overflow in multiplication happens C is truncated to a smaller storage. This may occur when it is desired to truncate to the same n-bits as with the operands. In this truncation, both overflow and underflow is possible. To avoid this overflow, the multiplication principle is followed that states all intermediate results should not be truncated. This can cause problems if three 32-bit operands are multiplied sequentially. At the first multiplication, a 64-bit intermediate result is obtained. Next, the 64-bit intermediate result is multiplied with the third 32-bit operand, which produces a 96-bit result.

In the NHCS graphics rendering system and method, the overflow is handled as follows. First, after each multiplication the 64-bits intermediate result is truncated to 32-bits. This assumes that no overflow can occur in the truncation. A second solution is to use NHCS to all operands to reduce their bits, say, from 32-bits to 16-bits. Then the sequentially multiplication of three integer yields a 48-bits result. Of course, this will result in some lose of precision, but it is useful if the sign of the final result is needed. This need may occur, for example, in back face culling.

Division

Division is a common operation, but it is expensive in CPU time. Moreover, in some embedded CPUs division is not supported in hardware at all. The NHCS graphic rendering system and method avoid this by implementing division with software.

The basic algorithm of the division of fixed-point numbers assumes operand A is a n-bit fixed-point data with a-bit mantissa, and operand B is a n-bit fixed point data with b-bit mantissa. In this situation, $$C=A/B$$

is a n-bit fixed-point data with (a−b)-bit mantissa. It can be seen that division will lose precision, so that the dividend must be shifted to increase its mantissa bits before division. If a result is needed with c-bits mantissa, the operand A must be pre-shifted with c−(a−b) bits. This pre-shift can cause operand A to overflow if A stores as n-bits. Generally, A is converted to 2n-bit integer before the pre-shift. For constant division, the value could be converted to its reciprocal, and then division becomes multiply. For non-constant division, the basic operation is reciprocal and a method such as Newton's iteration method can be used.

Given a, the desire is to obtain 1/a. The target function is:

$$f(x) = \frac{1}{x} - a$$

The iteration is:

$$x_{i+1} = x_i - f(x_i)/f'(x_i) = x_i - \left(\frac{1}{x_i} - a\right)/\left(-\frac{1}{x_i^2}\right) = x_i(2 - ax_i).$$

Each iteration step involves 2 multiplications and 1 subtraction, and gives twice the precision. Given a 256-items array for the initial guess, we 32-bit precision can be obtained with two iterations. The division latency for 32-bit precision has 1 memory lookup, 5 multiplications, and 2 subtractions.

Overflow does not occur in division for non-preshifted integers. However, when dividing a 64-bit integer by a 32-bit integer and storing the result in 32-bit integer, overflow may occur. This may happen when the dividend is pre-shifted. Moreover, underflow can occur if an inappropriate mantissa bit of result is chosen. As with other forms of division, a zero divisor should be prevented.

Fixed-Point Number Representation

The NHCS graphics rendering system and method disclosed herein use a normalized homogenous coordinate system (NHCS) to represent numbers. NHCS is a high-resolution variation of fixed-point number representation. In general, fixed-point representation of numbers is a way to represent a floating-point number using integers. Briefly, representing a number in a floating-point representation means that the decimal does not remain in a fixed position. Instead, the decimal "floats" such that the decimal always appears immediately after the first digit. As discussed above, using a floating point representation on a mobile device may not be possible due to processor and other hardware limitations.

The alternative is to use fixed-point number representation that is executed using integer functions. On mobile, wireless and other embedded platforms, the CPU may not be powerful enough to support floating-point operations and there typically are no coprocessors for accelerating the floating-point operations. Another important issue is that most floating point software routines are quite slow. Fixed-point is a much faster way to handle calculations.

Fixed-point number representation is a way to speed up any program that uses floating point. Typically, some of the bits are use for a whole part of the number and some bits are used for a fractional part. For example, if there are 32 bits available, a 16.16 configuration means that there are 16 bits before the decimal (representing the whole part of the number) and 16 bits after the decimal (representing the fractional part of the number). In this case, the value 65535.999984741211 is the largest possible number for the 16.16 configuration. This is obtained by setting the decimal portion to all 1's (in binary). The value 65535 with 16 bits is obtained for the whole part of the number. If 65535 is divided by 65536, then the value 0.999984741211 is obtained for the fractional part. There are other variants such as 24.8 (24 bits before the decimal and 8 bits after) and 8.24 (8 bits before the decimal and 24 bits after). The configuration type depends on the amount of precision that an application needs.

In an exemplary embodiment of the optimized NHCS graphics rendering system and method, Direct3D for mobile devices (D3DM) is used. In order to uses numbers in the D3DM transform and lighting (T&L) module, floating point numbers need to be converted to NHCS fixed-point numbers. Preferably, the conversion is easy as possible (such as we need not to know the range of the input vertices) while preserving the precision of the data. NHCS fixed-point number representation achieves these objectives.

NHCS is a type of vertex representation. NHCS can eliminate the annoying overflow, and provides a wider data space. For example, without NHCS, the model space vertex coordinates range from $2^{-16} \sim 2^{15}$, assuming that a 16-bit mantissa is used. On the other hand, if NHCS is used, the model space vertex coordinates range from $2^{-31} \sim 2^{31}$. By adopting NHCS it can be seen that both range and precision are greatly increased.

NHCS also makes the conversion from floating-point to fixed-point easy. It is not necessary to know the exact range of the input vertices. NHCS also eliminates the factitious overflow and takes advantage of the full storage of the buffer. Moreover, NHCS has the advantage of providing a wider data representation given the same precision. NHCS also preserves all transform and lighting (T&L) operations and makes use of the "w" in homogeneous coordinate representation.

Data Structure for Transform & Lighting

The data structure definition for the NHCS fixed-point format is shown in the following tables:

| Basic type | |
|---|---|
| SFIX64: | signed 64-bit integer |
| UFIX64: | unsigned 64-bit integer |
| SFIX32: | signed 32-bit integer |
| UFIX32: | unsigned 32-bit integer |
| SFIX16: | signed 16-bit integer |
| UFIX16: | unsigned 16-bit integer |
| SFIX8: | signed 8-bit integer |
| UFIX8: | signed 8-bit integer |
| Structure type | |
| typedef SFIX64 | SFIX64Quad[4] |

This data structure is used to store a 4-element vector, and each element is a 64-bit signed integer. This vector can be either NHCS or non-NHCS.
typedef SFIX64 SFIX64Triple[3]
This data structure is used to store a 3-element vector, and each element is a 64-bit signed integer. This vector can be either NHCS or non-NHCS.
typedef SFIX32 SFIX32Quad[4]
This data structure is used to store a 4-element vector, and each element is a 32-bit signed integer. This vector can be either NHCS or non-NHCS.

-continued typedef SFIX32 SFIX32Triple[3]
This data structure is used to store a 3-element vector, and each element is a 32-bit signed integer. This vector can be either NHCS or non-NHCS.
typedef SFIX16 SFIX16Quad[4]
This data structure is used to store a 4-element vector, and each element is a 16-bit signed integer. This vector can be either NHCS or non-NHCS.
typedef SFIX16 SFIX16Triple[3]
This data structure is used to store a 3-element vector, and each element is a 16-bit signed integer. This vector can be either NHCS or non-NHCS.
typedef UFIX8 UFIX8Quad[4]
This data structure is used to store a 4-element vector, and each element is an 8-bit unsigned integer. This vector is non-NHCS. This vector is used mainly for representing color RGBA components.
typedef SFIX32Mat4x4 SFIX32[16];
This data structure is used to store a 16-element matrix, which is 4 by 4. Each element of the matrix is a 32-bit unsigned integer. This matrix can be
either NHCS or non-NHCS.

Default Mantissa Bits

The default mantissa bits listed here are for fixed-point data representation:

| | | |
|---|---|---|
| #define DEFAULT_SFIX32 | 16 | //default mantissa bits for 32-bit signed |
| #define ONE_SFIX32 | 30 | //mantissa bits for 32-bit signed with (−1~1) |
| #define NORMAL_SFIX16 | 14 | //normal mantissa bits for 16-bit signed |
| #define TEXTURE_SFIX16 | 12 | //mantissa bits for 16-bit texture coordinate |
| #define ONE_UFIX16 | 15 | //mantissa bits for 16-bit unsigned within (0~1) |
| #define COLOR_UFIX16 | 8 | //color mantissa bits for 16-bit unsigned |

Constant

The constants listed here are for integer shifting during computation and conversion between different data formats:

| | |
|---|---|
| const SFIX32 | SFIX32_1 = (SFIX32)1<<DEFAULT_SFIX32; |
| const SFIX32 | ONE_SFIX32_1 = (SFIX32)1<<ONE_SFIX32; |
| const SFIX16 | NORMAL_SFIX16_1 = (SFIX16)1<<NORMAL_SFIX16; |
| const int | POSTOTEX = ONE_SFIX32− TEXTURE_SFIX16; |
| const int | NORMTOTEX = NORMAL_SFIX16 − TEXTURE_SFIX16; |

The basic operations have the following data structure definition:

Type Convert

The following macros are conversion macros for converting between different data formats:

```
#define PosToTex(a)    ((SFIX16)((a)>>POSTOTEX))
#define NormToTex(a)   ((SFIX16)((a)>>NORMTOTEX))
```

-continued

```
#define FloatToSFIX32(a,n)    ((SFIX32)((a)*((SFIX32)1<<(n))) )
#define SFIX32ToFloat(a,n)    ((float)(a)/((SFIX32)1<<(n)))
#define FloatToSFIX16(a,n)    ((SFIX16)((a)*((SFIX16)1<<(n))))
#define FloatToUFIX16(a,n)    ((UFIX16)((a)*((UFIX16)1<<(n))))
#define SFIX16ToFloat(a,n)    ((float)(a)/((SFIX16)1<<(n)))
#define FloatToUFIX8(a)       ((UFIX8)((a)*255))
```

Operations

The following macros are computation macros for computing between fixed-point data:

```
#define Mul_SFIX32(a,b,n)    ( (SFIX32)(((SFIX64)(a)*(b))>>(n)) )
#define Mul_UFIX32(a,b,n)    ( (UFIX32)(((UFIX64)(a)*(b))>>(n)) )
#define Div_SFIX32(a,b,n)    ( (SFIX32)(((SFIX64)(a)<<(n))/(b)) )
#define Mul_SFIX16(a,b,n)    ( (SFIX16)(((SFIX32)(a)*(b))>>(n)) )
#define Mul_UFIX16(a,b,n)    ( (UFIX16)(((UFIX32)(a)*(b))>>(n)) )
#define Mul_UFIX8(a,b,n)     ( ((UFIX16)(a)*(b))>>(n))
```

The data structure definition for the different types of data are as follows:

| Name | Type | Mantissa bits |
|---|---|---|
| Input data | | |
| Model space vertex coordinates | SFIX32Quad | NHCS |
| Model space normal | SFIX16Triple | NORMAL_SFIX16 |
| Model space texture coordinates | SFIX16 | TEXTURE_SFIX16 |
| Model space diffuse/specular color | DWORD with A8R8G8B8 | |
| Vertex/Texture transform matrices | SFIX32Mat4x4 | DEFAULT_SFIX32 |
| Light/view vectors for lighting | SFIX32Quad | NHCS |
| Fog parameters | SFIX32 | DEFAULT_SFIX32 |
| Color in light/material | UFIX8Quad | 0 |
| Power in material | UFIX8 | 0 |
| Output data | | |
| Transformed vertex coordinates (x, y, z) | SFIX32 | ONE_SFIX32 |
| Transformed vertex coordinates (w) | SFIX32 | DEFAULT_SFIX32 |
| Color | DWORD with A8R8G8B8 | |
| Texture coordinates | SFIX16 | TEXTURE_SFIX16 |
| Fog | SFIX32 | DEFAULT_SFIX32 |

Intermediate data's type and mantissa bits are listed within each function.

Details of each of the above data types is listed below. The reason why such data types and the mantissa bits were chosen are explained.

Lighting

Position/Direction

Light position or direction is taken as

| Light position | SFIX32Quad | NHCS |
|---|---|---|

This representation provides the enough range and precision for lighting, and no extra cost exists comparing with the traditional representation such as non-NHCS.

Viewpoint

Viewpoint is represented as:

| Viewpoint | SFIX32Quad | NHCS |
|---|---|---|

This representation provides enough range and precision for lighting, and no extra cost exists comparing with the traditional representation such as non-NHCS.

Lighting Color

Lighting color includes:
Ambient.
Diffuse
Specular

Their representation is:

| Lighting color | UFIX8Quad | No mantissa |
|---|---|---|

This presentation is a natural expansion of color in D3D in A8R8G8B8 style.

Material Property

Material color includes:
Ambient.
Diffuse
Specular

Each of them is represented as:

| Material color | UFIX8Quad | No mantissa |
|---|---|---|

This presentation is a natural expansion of color in D3D in A8R8G8B8 style. The power component is represented as:

| Power component | UFIX8 | No mantissa |
|---|---|---|

In one embodiment of the NHCS graphics rendering system 100, the power is assumed to be an integer from 0 to 127.

Normal

Normal is taken as:

| Normal | SFIX16 | NORMAL_SFIX16 mantissa |
|---|---|---|

From empirical evidence, it is concluded that a 16-bit normal is enough for rendering a Microsoft® Windows CE® device window. In a preferred embodiment, the NORMAL_SFIX16 is equal to 14. Moreover, the 1 sign bit must be preserved and 1 additional bit should be preserved as integer part for normal coordinates like 1.0 or −1.0.

Texture Coordinate

Texture coordinate is represented as:

| Texture coordinate | SFIX16 | TEXTURE_SFIX16 mantissa |
|---|---|---|

In a preferred embodiment, the TEXTURE_SFIX16 is equal to 12. Further, there is 1 bit for sign and 3 bits for an integer part. This provides supports for finite tiling (−8~8), and gives 4-bits sub-pixel resolution for a texture as large as (256×256). Note that there is a trade off between the titling size and sub-pixel resolution.

Output Vertex Coordinate

The NHCS graphics rendering system 100 produces an output vertex suitable for a vertex shader. The representation is:

| x | SFIX32 | ONE_SFIX32 mantissa |
|---|---|---|
| y | SFIX32 | ONE_SFIX32 mantissa |
| z | SFIX32 | ONE_SFIX32 mantissa |
| w | SFIX32 | DEFAULT_SFIX32 mantissa |

When a vertex is within a view frustum, the value for x, y will be within (−1, 1), and z in (0~1). A vertex outside the view frustum will be clipped before output. That is why ONE_SFIX32 is given as 30 and does not suffer from overflow. The w component is not normalized in (−1~1). A 16-bit fraction and a 15-bit integer is a good balance between the precision and range of w.

Matrices

Prior to rendering, several matrices should be ready. All matrices are of the data structure SFIX32, with DEFAULT_SFIX32 bits mantissa.

Model Space to World Space $M_w$: Transform matrix from model space to world space.

Currently, a D3DM implementation assumes that the last column of this matrix is $(0,0,0,1)^T$. No error is returned, and if a user specifies a matrix with different last column texture coordinate and fog it will be incorrect.

World Space to View Space $M_v$: Transform matrix from world space to view space.

Currently, a D3DM implementation assumes that the last column of this matrix is $(0,0,0,1)^T$. No error is returned, and if user specifies a matrix with different last column texture coordinate and fog it will be incorrect.

View Space to Clip Space $M_p$: Projection matrix from view space to clip space Currently, a D3DM implementation assumes that the last column of this matrix is $(0,0,1,0)^T$ or $(0,0,a,0)^T$. No error is returned. For correct fog, the last column should be $(0,0,1,0)^T$ to give a correct w value. This is called the W-friendly projection matrix.

Model Space to View Space $M_{wv}$: Matrix combination from model space to view space $M_{wv}=M_w M_v$ A D3DM implementation combines the matrices $M_w$ and $M_v$ and the last column of this matrix is $(0,0,0,1)^T$. No error is returned. If user specifies a matrix with different last column texture coordinate and fog it will be incorrect.

Model Space to Clip Space $M_{wvp}$: Matrix combination from model space to clip space $M_{wp}=M_w M_v M_p$ A D3DM implementation combines the matrices $M_w$, $M_v$ and $M_p$. The last column of this matrix is determined by the parameters of these matrices. No error is returned.

V. Operational Overview

Figure 4:
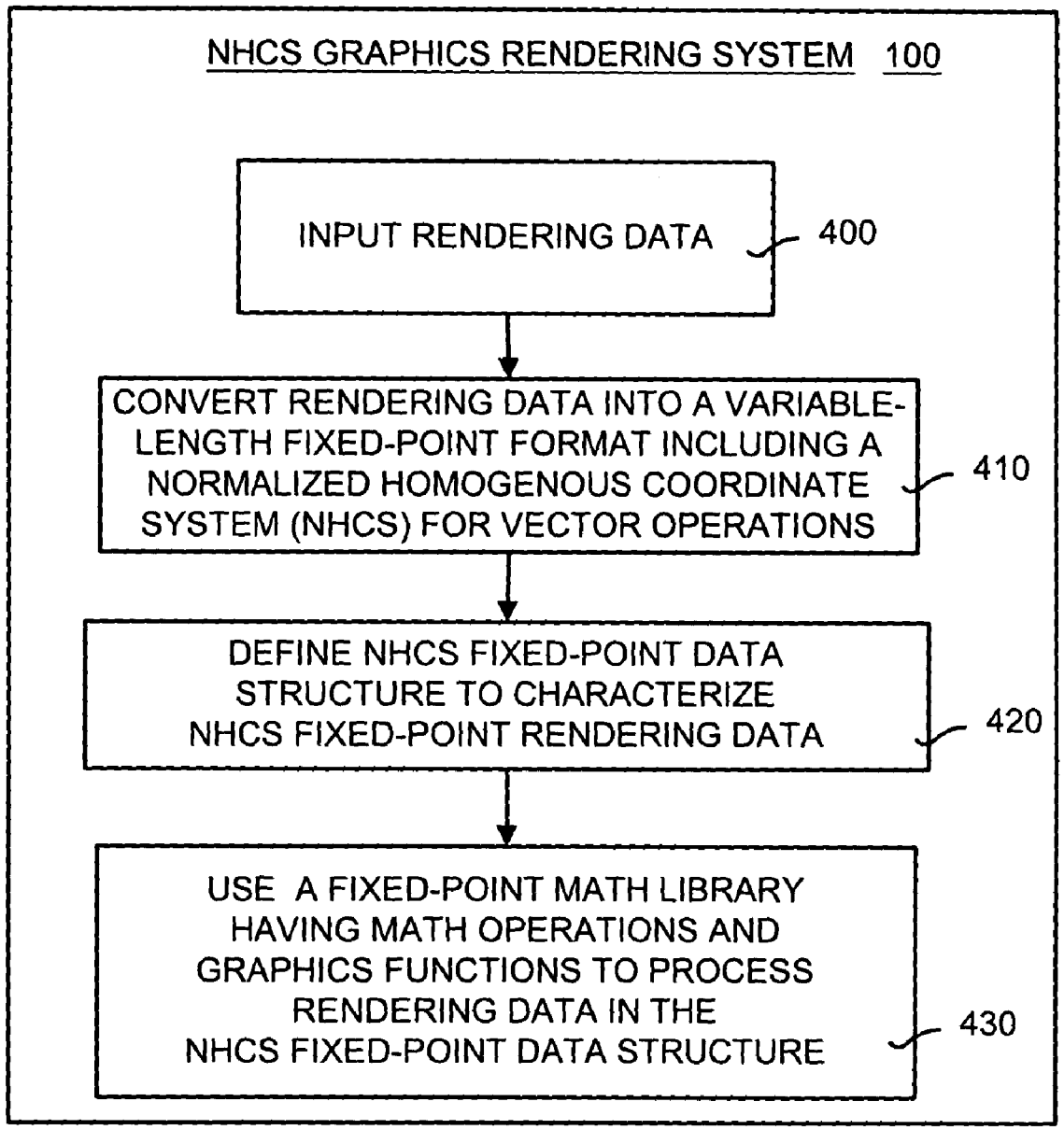
FIG. 4 is a general flow diagram illustrating the operation of the NHCS graphics rendering method of the NHCS graphics rendering system shown in FIG. 1.

The NHCS graphics rendering system 100 disclosed herein uses the NHCS graphics rendering method to enable efficient and fast graphics rendering on a mobile computing device. FIG. 4 is a general flow diagram illustrating the operation of the NHCS graphics rendering method of the NHCS graphics rendering system 100 shown in FIG. 1. The method begins by inputting rendering data (box 400). In one embodiment, the rendering data is in a floating-point format. In another embodiment, the rendering data is in a fixed-point format. Next, the rendering data is converted into a variable-length fixed-point format including a normalized homogenous coordinate system (NHCS) fixed-point format for vector operations (box 410). The NHCS fixed-point format allows computations and operations to be performed on the converted rendering data such that a range can be predicted. Any data outside of the range is truncated. This processing of the data in the NHCS fixed-point format allows more efficient use of valuable memory and processing power.

A NCHS data structure then is defined to characterize the converted rendering data (box 420). Next, a fixed-point math library is used to process the rendering data in the NHCS data structure (box 430). The math library includes mathematical operations and graphics functions. The processed rendering data then is ready for rendering by a rendering engine.

VI. Operational Details

Figure 5:
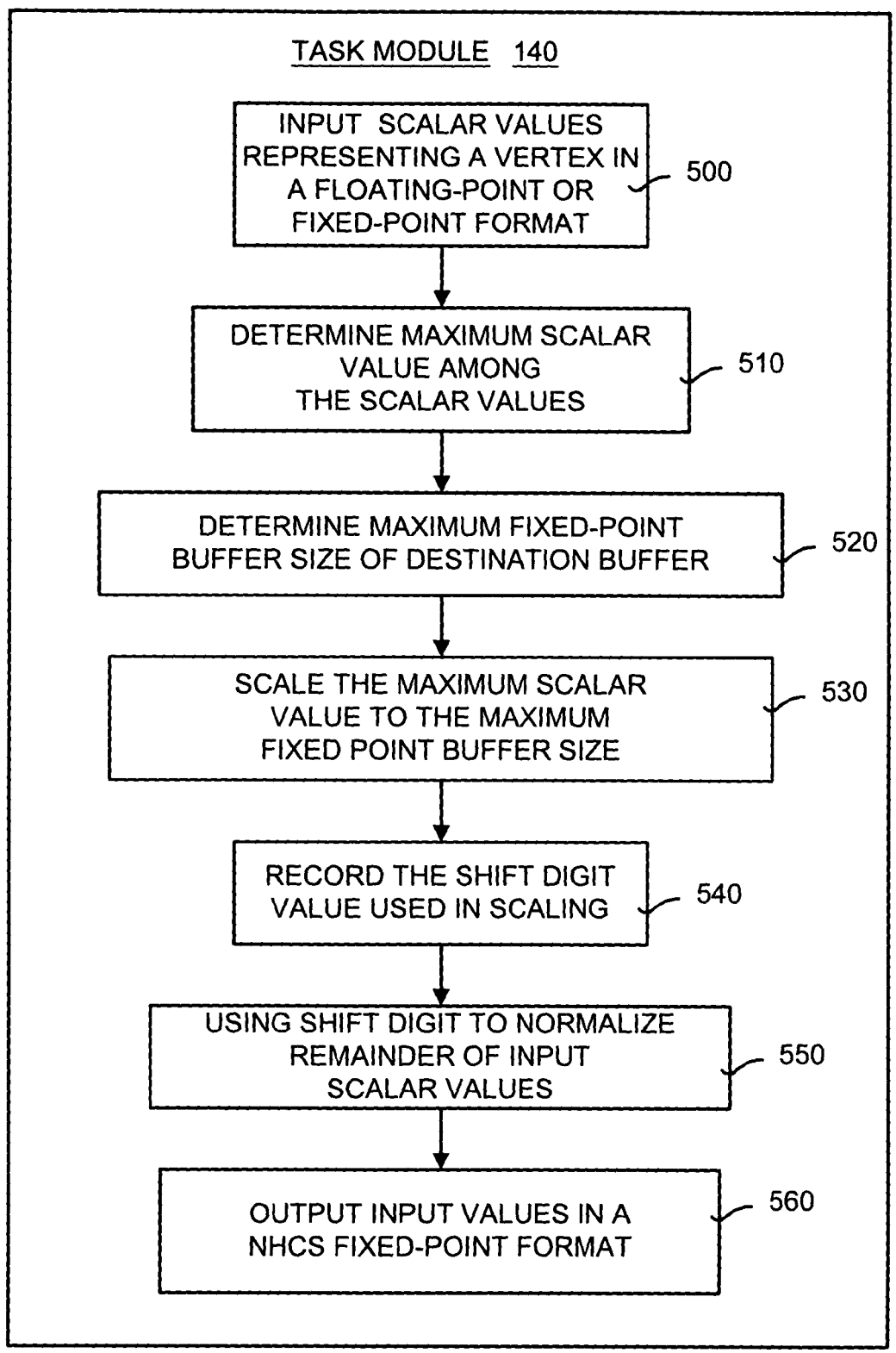
FIG. 5 is a detailed flow diagram illustrating the operation of the conversion process of the task module shown in FIGS. 1 and 3.

FIG. 5 is a detailed flow diagram illustrating the operation of the conversion process of the task module 140 shown in FIGS. 1 and 3. In general, the task module 140 converts input rendering data into a NHCS fixed-point format. The input format can be a floating-point format or a fixed-point format. The task module 140 also includes data structure definitions and preliminary mathematical operations.

In general, a normalized homogenous coordinates (NHCS) is a vertices representation. More specifically, as shown in FIG. 5, the input to the task module 140 is scalar values representing a vertex in either a floating-point or a fixed-point format (box 500). Next, a maximum scalar value is determined from among all of the scalar values (box 510). Moreover, a maximum fixed-point buffer representation for a destination buffer is determined (box 520). In one embodiment, the maximum fixed-point buffer representation is the size of the destination buffer, characterized by the number of bits.

Next, the maximum scalar value is scaled to the maximum fixed-point buffer representation (box 530). The number of digits that the value is shifted then is recorded (box 540).

This number of digits is known as the shift digit. Using the shift digit, the remainder of the scalar values are normalized (box 550). The output is the input values represented in a NHCS fixed-point format (box 560).

Figure 6:
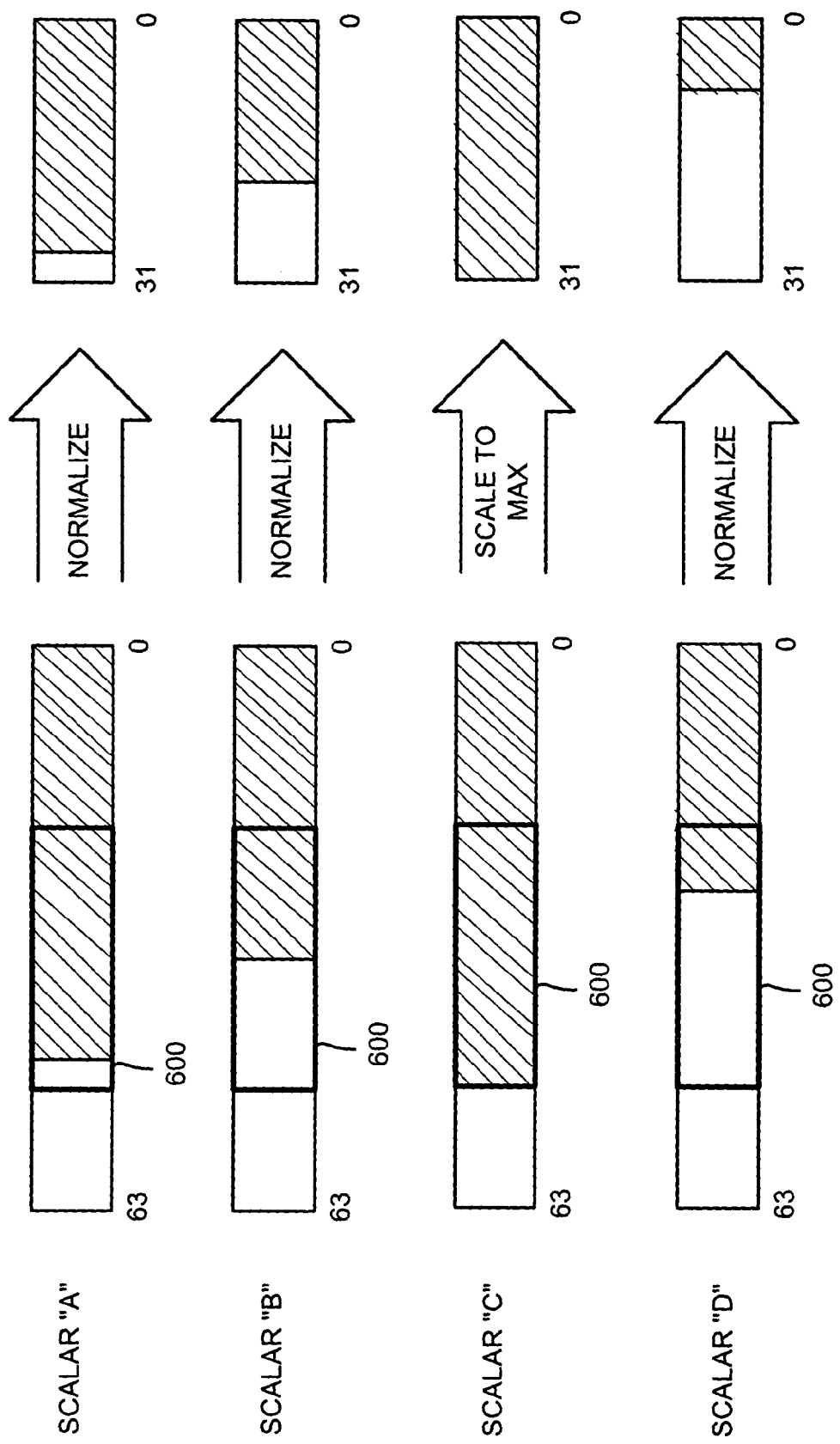
FIG. 6 is a working example of the conversion process shown in FIG. 5.

FIG. 6 is a working example of the conversion process shown in FIG. 5. By way of example, assume that a vertex has 4 scalars, a,b,c and d. As shown in FIG. 6, c has the maximal value among these 4 scalars. The followings steps convert a vector to a NHCS representation. First, the maximum in the four scalars is determined. As shown in FIG. 6, the maximum scalar value is scalar c. It should be noted that the size of the each of the scalars can be represented using 64 bits (0–63). Next, the maximum size of the destination fixed-point buffer representation is determined. In FIG. 6, this size is represented by the window 600 (shown outlined as a thicker line). The maximum size of the destination fixed-point buffer is 32 bits (0–31). Thus, the size of the window is 32 bits.

Next, scaling is performed such that the maximum scalar value (scalar c) is scaled to the maximum size of the destination fixed-point buffer, in this case 32 bits. The shift digit r, or the number of digits needed to shift scalar c, is recorded. Finally, the shift digit r is used to normalize the rest of the scalars (a, b, d) based on the maximum scalar c. This converts input data in a floating-point or fixed-point format into a NHCS fixed-point format.

NHCS preserves the full resolution of the maximal resolution and in vector computation. With NHCS, the intermediate result is stored as L×2-bits for the original L-bits, which assures no precision loss in multiplication. The intermediate result is then truncated to L-bits to preserve maximum precision (in FIG. 6, L=32).

Figure 7:
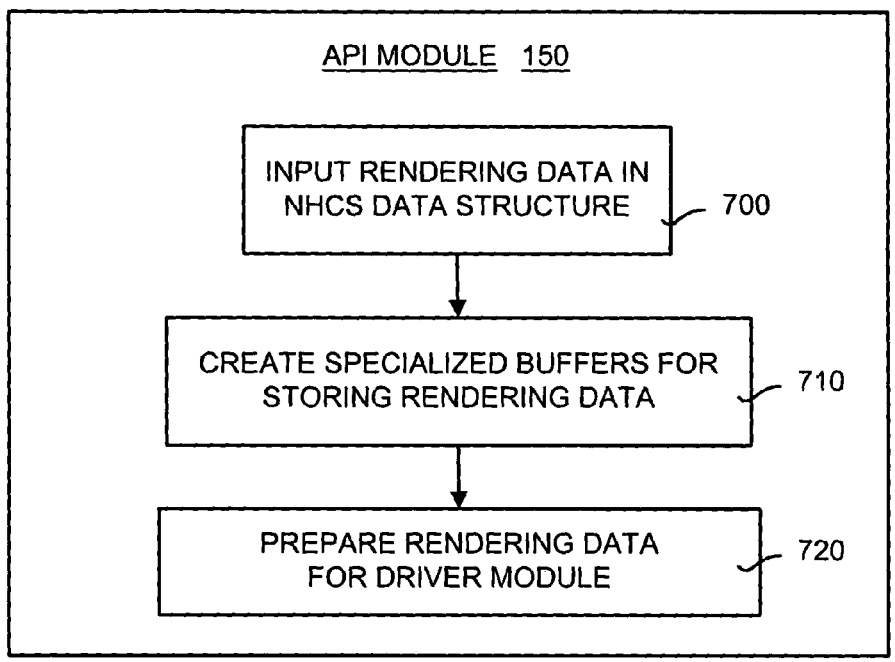
FIG. 7 is a detailed flow diagram illustrating the operation of the API module shown in FIGS. 1 and 3.

FIG. 7 is a detailed flow diagram illustrating the operation of the API module 150 shown in FIGS. 1 and 3. In general, the API module 150 generates buffers for the data computed and sent by the task module 140. In addition, the API module 150 prepares the data for the driver module 160. The API module process begins by inputting rendering data in an NHCS data structure (box 700). Next, specialized buffers are created or generated for storing the converted rendering data (box 710). This includes generating an index buffer, a vertex buffer and a command buffer. Finally, the rendering data is prepared for the driver module (box 720). Preparing the rendering data includes specifying 2-D and 3-D primitives and specifying how those primitives are to be drawn.

Figure 8:
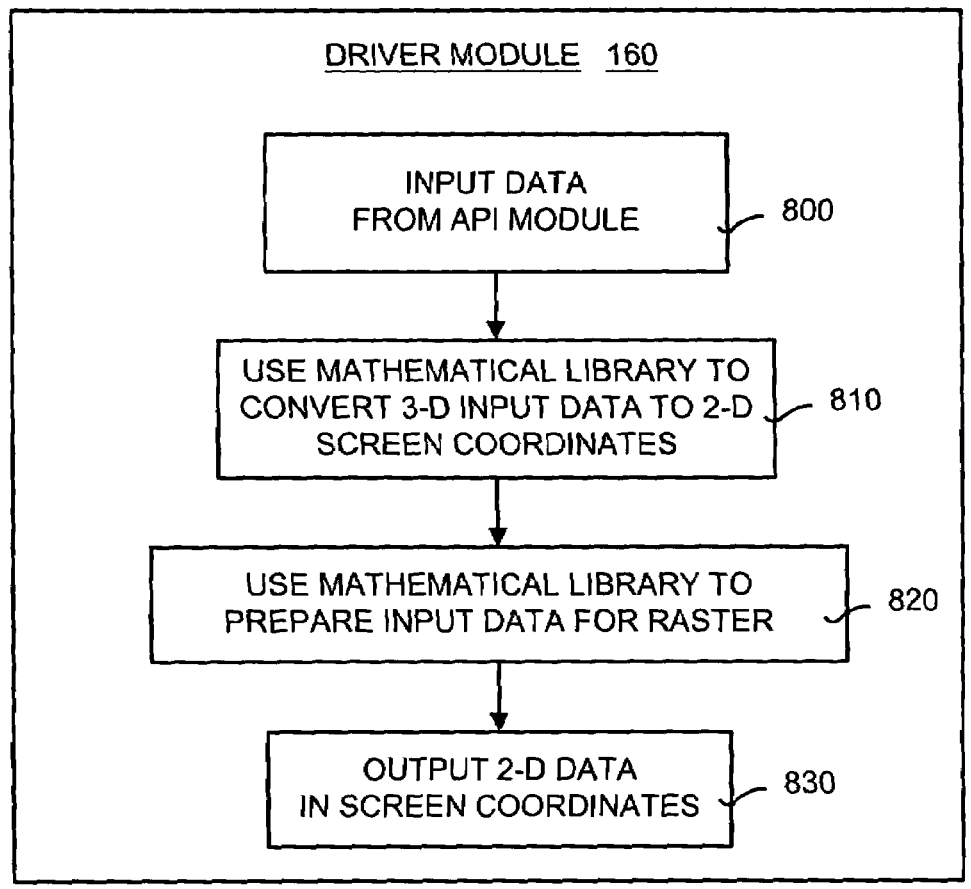
FIG. 8 is a detailed flow diagram illustrating the operation of the driver module shown in FIGS. 1 and 3.

FIG. 8 is a detailed flow diagram illustrating the operation of the driver module 160 shown in FIGS. 1 and 3. In general, the driver module prepare the rendering data for the rendering engine and raster. More specifically, the driver module 160 inputs the stored data from the API module (box 800). Next, the mathematical library is used to convert the 3-D input data into 2-D screen coordinates (box 810). The mathematical library also is used to prepare input data for the rendering engine and for raster (box 820). Finally, the driver module 160 outputs 2-D data in screen coordinates for rendering on a monitor (box 830).

Mathematical Library

The mathematical library includes mathematical operations and graphics functions. The mathematical library now will be discussed in detail.

Feature Division

The features of the mathematical library are divided into features that are supported by the rasterizer, resource management, and features supported by transform and lighting (T&L). The mathematical library implements all features supported by T&L.

Features Supported in the Rasterizer

The following features are features in the mathematical library that are supported by the rasterizer:
Point, line list, line strip, tri list, tri strip and tri fan rendering
Point, wireframe, solid fill
Flat and Gouraud shading
Depth test with various compare mode and pixel rejection
Stencil compare and pixel rejection
Depth buffer-less rendering is supported as well
W buffer support
MipMap textures are supported (Interpolate)
8 stage multi-texture with D3D8 fixed function blending options
Point, linear, anisotropic, cubic and Gaussian cubic texture filtering
Alpha blending (with several blend modes)
Palletized textures
Perspective correct texturing (not on by default)
Color channel masking (COLORWRITEENABLE)
Dithering
Multisampling for FSM
Texture address modes Features Supported in Resource Management Resources are objects that are resident in memory, such as textures, vertex buffers, index buffers and render surfaces. Resource management is the management of the various memory operations on these objects. These operations include allocation, copying, moving, locking for exclusive usage, unlock and de-allocation. The following features are features in the mathematical library that are supported in resource management:
Swap chain creation and management for display
Depth/stencil buffer creation and management
Vertex buffer creation and management
Index buffer creation and management
Texture map creation and management
Many texture formats including DXT compressed texture
Scratch surface creation/management for texture upload
MipMap textures are supported (Build)
Dirty rectangular texture update mechanism
All buffers lockable (assuming driver support!)

Features Supported in T&L

The following features are features in the mathematical library that are supported by in T&L:
Texture coordinate generation
View, projection and world transform matrices
Single transform matrix per texture coordinate set (8 sets max)
Up to 4 dimensions per texture coordinate set
Ambient/diffuse/specular lighting and materials
Directional and point lights
Back face culling
Fog (depth and table based)

Math Functions Indexed by Features

In this section, the mathematical functions indexed by features are described. The functions cover transform, culling, lighting, culling, texture and other miscellaneous functions. In addition, the overflow and underflow (resolution loss) problems of these functions are discussed.

Transform Functions

---
NHCS vector transform
--- int TransQuad_SFIX32(SFIX32Quad b, SFIX32Mat4x4 m, SFIX32Quad c)
This function transforms a 32-bits NHCS vector b to another 32-bits NHCS vector c by matrix m.
Parameters      b,
         Input vector in SFIX32Quad in NHCS format
         m
         Transform matrix in SFIX32Mat4x4 and DEFAULT_SFIX32 format.
         c,
         Output vector after transform in SFIX32 format in NHCS representation.
Return value      An integer indicates the shift bits in converting intermediate 64-bits c to 32-bits NHCS c.
Remarks      Overflow:
         The maximum possible intermediate value is: 4*(0x8000 0000*0x8000 0000) = 0x 1 0000 0000 0000 0000. This indicates that a 64-bits intermediate value will have overflow in the intermediate data before NHCS.
         Underflow:
         Appears when truncated from intermediate buffer.

---
Matrix combination
--- void MatMul4x4_SFIX32(SFIX32Mat4x4 m1, SFIX32Mat4x4 m2, SFIX32Mat4x4 m3, UFIX8 n)
This function combines two 32-bits 4 x 4 matrices to another 32-bits 4 x 4 matrix
Parameters      m1, m2
         Input matrices in SFIX32Mat4x4
         n
         Input shift bits for shifting the 64-bits multiplication results to 32-bits results.
         m3,
         Output combined matrix.
Return value      No return value
Remarks      Shift
         The matrices m1, m2, m3 can have different mantissa bits. Suppose m1 with a bits mantissa and m2 with b bits mantissa, to get a c-bits mantissa m3, we should set n = (a + b) − c
         Overflow:
         The maximum possible intermediate value is: 4*(0x8000 0000*0x8000 0000) = 0x 1 0000 0000 0000 0000. This indicates that a 64-bits intermediate value will have overflow in the intermediate data. When truncating the 64-bits intermediate result to 32-bits output, overflow is also possible.
         Underflow:
         Appears when truncated from intermediate buffer.

---
Non-NHCS vector transform
--- void TransQuad_SFIX16(SFIX16Quad b, SFIX32Mat4x4 m, SFIX16Quad c)
This function transforms a 16-bits vector to a 16-bits vector.
Parameters      b,
         Input vector in SFIX16Quad with TEXTURE_SFIX16 bits mantissa.
         m
         Transform matrix in SFIX32Mat4x4 and DEFAULT_SFIX32 format.
         c
         Output vector after transform in SFIX16 format with TEXTURE_SFIX16 bits mantissa.
Return Value      No return value.
Remarks      Overflow:
         Appears when go out range of TEXTURE_SFIX16 mantissa.
         Underflow:
         Appears when go out range of TEXTURE_SFIX16 mantissa.

void TransNorm_SFIX16(SFIX16Triple b, SFIX32Mat4x4 m, SFIX16Triple c)
This function transforms a 16-bit normal to a 16-bits normal.
Parameters      b
         Input vector in SFIX16Triple with NORAML_SFIX16 bits mantissa.
         m
         Transform matrix in SFIX32Mat4x4 and DEFAULT_SFIX32 format.
         c
         Output vector after transform, it is in SFIX16 format with NORMAL_SFIX16 bits mantissa, normalized.
Return value      No return value.
Remarks      Matrix
         For transform normal, only the upper 3 x 3 part of m is used.
         Normalization:
         The output is normalized by Normalize_SFIX16Triple( )

---
NHCS to non-NHCS convert
---

Void DivWW_SFIX32(SFIX32 w, int shift, SFIX32Quad c, SFIX32Quad cc)
This function transforms a NHCS vertex to clip space non-NHCS vertex.
Parameters      w
         Input w to be divided from the NHCS vertex, SFIX32. It is the b[3] in TransQuad_SFIX32( ).
         shift
         Input shifted bits return from TransQuad_SFIX32( ). For calculating the correct w
         c
         Input vertex after TransQuad_SFIX32( ), NHCS
         cc
         Output vertex with non-NHCS SFIX32 format. cc[0]~cc[2] has ONE_SFIX32 bits mantissa, and cc[3] has DEFAULT_SFIX32 bits mantissa.
Return value      No Return value
Remarks      This function is related to TransQuad_SFIX32( ).
         With this function we get the actual clip space vertex from NHCS clip space vertex for finally converting to float -continued

|  |  |
|---|---|
|  | point vertex and output to vertex shader. |
| Void DivW_SFIX32(SFIX32 w, int shift, SFIX32Quad c, SFIX32Quad cc) |  |
| This function transforms a NHCS vertex to clip space non-NHCS vertex. |  |
| Parameters | w |
|  | Input w to be divided from the NHCS vertex, SFIX32. It is the b[3] in TransQuad_SFIX32( ). |
|  | shift |
|  | Input shifted bits return from TransQuad_SFIX32( ). For calculating the correct w |
|  | c |
|  | Input vertex after TransQuad_SFIX32( ), NHCS |
|  | cc |
|  | Output vertex with DEFAULT_SFIX32 format. |
| Return value | No Return value |
| Remarks | This function is related to TransQuad_SFIX32( ). This function is used in texture coordinate generation from view space position, so the precision and range is different from DivWW_SFIX32 above. |

Culling Functions

| Backface testing |  |
|---|---|
| BOOL Backface_SFIX32(SFIX32* a, SFIX32* b, SFIX32* c, BOOL bCCW) |  |
| This function checks if the triangle (a, b, c) is a back face. |  |
| Parameters | a, b, c |
|  | 3 sequential vertex of an triangle, they are in SFIX32Quad with NHCS representation |
|  | bCCW |
|  | Face orientation, TRUE for CCW, FALSE for CW |
| Return value | BOOL, TRUE for back face, FALSE for non-back face. |
| Remarks | There is a sequential multiplication of 3 operands. NHCS is used to compress the operand from 32-bits to 16-bits since we only need the sign. |

View Frustum Culling

Figure 9:
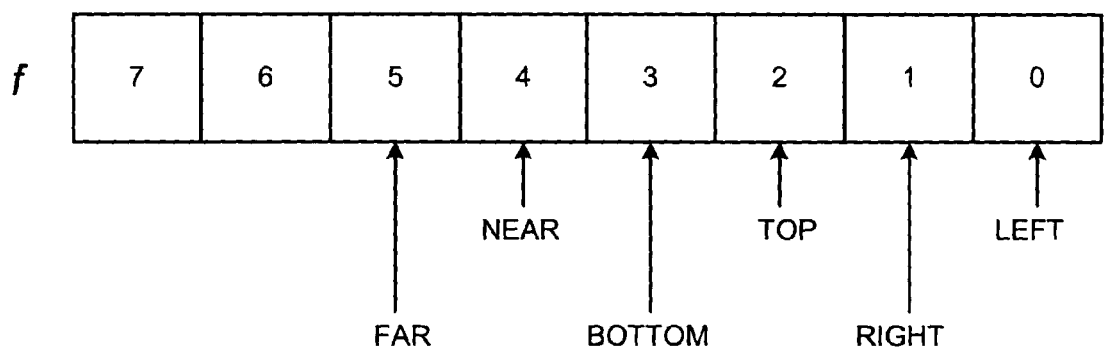
FIG. 9 illustrates an exemplary implementation of a buffer to store culling planes.

View frustum culling removes the triangles whose vertices are outside of one view frustum plane. View frustum involves 6 planes:
  Leftplane.
  Right plane.
  Top plane.
  Bottom plane.
  Near plane
  Far plane.
A UFIX8 is set to hold 6 flags for culling. FIG. 9 illustrates an exemplary implementation of a buffer to store culling planes. In particular, FIG. 9 shows an UFIX8 format buffer to store the culling planes. View frustum culling is performed in clip space. If it is assumed that b is a NHCS coordinate in the clip space, the algorithm is:

```
SFIX32Quad b; // NHCS clip space coordinates
UFIX8 f=0;
if (b[0]<-b[3])
    f |= 0x01;
else if (b[0]> b[3])
    f |= 0x02;
if (b[1]<- b[3])
    f |= 0x04;
else if (b[1]> b[3])
    f |= 0x08;
if (b[2]<0)
    f |= 0x10;
else if (b[2]> b[3])
    f |=  0x20;
```

If three flags for each vertex are obtained, an "AND" operation can be used to test whether the flags are outside of the same plane.

The flag is also useful in the vertex cache, and the 2 unused bits will indicate:
  Transformed status (indicates whether a vertex has been transformed)
  Lit status (indicates whether a vertex has been lit).

Lighting Functions

The direct3D for mobile supports both directional light and point light. The lighting model used is the Phong model for vertices. Lighting is done in model space. A material should be assigned to the object, and the ambient, diffuse, specular, power property is denoted as $M_{Ambient}$, $M_{Diffuse}$, $M_{Specular}$ and $M_{Power}$ respectively. In D3D, $M_{Ambient}$, $M_{Diffuse}$, $M_{Specular}$ are defined as (r, g, b, a), and each component is a float within [0~1].

Each component only need be represented as:

| Lighting component | UFIX8 | 8 bits mantissa |
|---|---|---|

The color of lighting is noted as $L_{Ambient}$, $L_{Diffuse}$ and $L_{Specular}$. Given normalized vectors N, L and V, which represent vertex normal, vertex-light direction and vertex-view direction respectively, the color of a vertex can be calculated as:

$$C=L_{Ambient}M_{Ambient}+L_{Diffuse}M_{Diffuse}(N \cdot L)+L_{Specular}M_{Specular}(N \cdot H)^{M_{Power}}$$

Figure 10A:
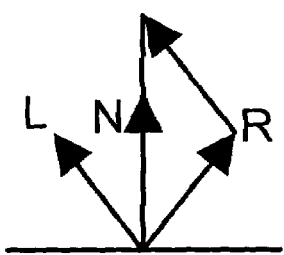
FIGS. 10A and B illustrate an exemplary implementation of normalized vectors in a Direct3D mobile (D3DM) Phong Model.
Figure 10B:
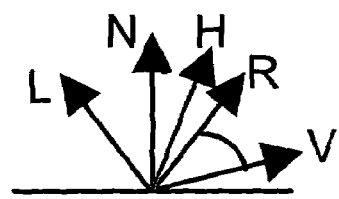

FIGS. 10A and B illustrate an exemplary implementation of normalized vectors in a D3DM Phong Model. As shown in FIG. 10A, L is the vector from vertex to light, and N is the vertex normal. R is the reflection direction of light, which is symmetric to L by N. As shown in FIG. 10B, V is the vector from vertex to view point, and H is the half vector of L+V.

All the vectors are transformed to the same space for "dot product" computation, and are normalized for calculation. In this implementation, the model space for saving the transformation of each vertex normal to view space was chosen. However, this choice also brings problems if the model transform contains shears and scaling. Although lighting in model space is discussed here, it is easy to extend the discussion to other spaces. Both lit in model space and lit in view space are supported in the rendering pipeline of the NHCS graphics rendering system.

Invert Length of a Normal

SFIX32 TripleInvLen(SFIX16Triple a)
This function gives the invert length of a SFIX16Triple, which is useful in normalize
Parameters     a
               Un-normalized input
               in SFIX16 in NHCS
Return value   Invert length in SFIX32
Remarks        Assume a is a n-bits mantissa,
               the result is of 42 − n bits
               mantissa. It does not matter
               if 42 − n > 32, because the
               calculation does not use n
               explicitly.
               Newton's iteration method
               is used here for solving the
               invert square root, using
               a 256-item lookup table.

NHCS Vector Normalization

Void Normaliz __SFIX16Triple(SFIX16Triple a, SFIX16Triple b)
This function normalizes a NHCS SFIX16Triple.
Parameters     a
               Un-normalized input
               in SFIX16 in NHCS
               b
               Normalized output in SFIX16
               format with NORMAL__SFIX16
               mantissa
Return value   No return value
Remarks        We use SFIX32 to hold the
               intermediate TripleInvLen( )
               result to prevent overflow
               and keep precision.

Negative Normalization of NHCS Vector

Void NagNormalize_SFIX16Triple(SFIX16Triple a, SFIX16Triple b)
This function gives a negative result to Normalize_SFIX16Triple
Parameters     A
               Un-normalized input
               in SFIX16 in NHCS
               b
               Normalized output in SFIX16
               format with NORMAL__SFIX16
               mantissa
Return value   No return value
Remarks        We use SFIX32 to hold the
               intermediate TripleInvLen( )
               result to prevent overflow.
               It is used in normalization
               of directional light. Gives a
               normal L from vertex to
               lighting source.

Subtraction of Two NHCS Vectors

Void SubNorm__SFIX32Quad (SFIX32Quad a, SFIX32Quad b, SFIX16Triple c)
This function calculates normal from subtraction of two NHCS vectors.

Parameters     a, b
               Input vectors in SFIX32
               with NHCS format
               c
               Normalized (a − b) in SFIX16
               with NORMAL__SFIX16 bits
               mantissa
Return value   No return value
Remarks        It is used in normalization
               of view direction V and light
               direction L when using point
               light.

Dot Production of Two Normalized Vectors

UFIX16 Dot__SFIX16Triple(SFIX16Triple a, SFIX16Triple b)
This function returns the dot product of two normalized vector
Parameters     a, b
               Normalized input in SFIX16
               with DEFAULT__SFIX16 bits
               mantissa.
Return value   Dot product with ONE__UFIX16
               bits mantissa
Remarks        If the two vectors are normalized,
               there will no overflow at
               all because the result will
               be within (0~1).
               Value that less than 0 is clamped to 0.

Power

UFIX16 Power__UFIX16 (UFIX16 a, UFIX8 n)
This function returns the power(a, n)
Parameters     a
               Power base with ONE__UFIX16
               bits mantissa.
               n
               Power exponential within 0~127
Return value   Power value with UFIX16 format
Remarks        We use the efficient digit
               of n to determine how much
               multiply we need.
               In rendering pipeline the n
               can be fixed. We use static
               variables to store the n and
               its efficient digit. If n is the
               same in the consequential calling,
               the efficient digit will be
               same as previous one instead of
               calculated again.

Half Vector

The half vector is used to approximate the actual cos θ=(V·R) by cos ψ=(N·H) for calculating the specular component. H can be calculated by the normalized L and V:

$$H = \frac{L+V}{|L+V|}$$

L and V are represented by SFIX16Triple with NORMAL_SFIX16 bits mantissa. To avoid overflow and keep precision, they are first added together as a SFIX32Triple. Next, the half vector H is made in NHCS SFIX16Triple, and H then is normalized.

Texture Coordinate Generation

Texture coordinate generation uses view space normal/position/reflection to generate the texture coordinates in each vertex. View space normal and position is available after lighting in view space. However, reflection vectors need to be calculated here.

Reflection Vector from Normal and View

---

Void CalcR_SFIX16Triple(SFIX16Triple norm, SFIX16Triple view, SFIX16Triple reflect)
This function calculates reflection vector from normal and view
Parameters         Norm
                   normalized normal in
                   SFIX16, NORMAL_SFIX16
                   view
                   normalized view direction
                   in SFIX16, NORMAL_SFIX16
                   reflect
                   Normalized output in SFIX16
                   format with NORMAL_SFIX16
                   mantissa
Return value       No return value
Remarks            R = 2(N · V)N − V

---

NHCS Clip Space Coordinates Clipping Algorithm

The model-view transform and view-projective transform can be combined into a 4×4 matrix $P_{4\times4}$:

$$(x \; y \; z \; 1)P_{4\times4} = \left( \frac{x_p}{w_p}w_p \quad \frac{y_p}{w_p}w_p \quad \frac{z_p}{w_p}w_p \quad w_p \right) \quad (1)$$

The term $$\frac{x_p}{w_p} = x_w$$

is defined, and is similar to y, z. In fact, the term is the normalized screen space coordinates. This assumes the correct wp is obtained for each vertex. Multiplying (1) by $$\left( \frac{1}{w_p} P_{4\times4}^{-1} \right),$$

yields:

$$\left( \frac{x}{w_p} \quad \frac{y}{w_p} \quad \frac{z}{w_p} \quad \frac{1}{w_p} \right) = (x_w \; y_w \; z_w \; 1)P_{4\times4}^{-1} \quad (2)$$

Equation (2) is a linear equation, which indicates that 1/wp can be linearly interpolated. Given three vertices and three texture coordinates: $(x_i \; y_i \; z_i \; 1)$ and $(u_i \; v_i \; 1)$ (i=1,2,3) for a triangle, there exists an affine transform which maps texture coordinates to object space, if the triangle is not degenerated:

$$(u \; v \; 1)A_{3\times4} = (x \; y \; z \; 1) \quad (3)$$

Combining (3) and (1), both sides are divided by the wp, and thus:

$$\left( \frac{u}{w_p} \quad \frac{v}{w_p} \quad \frac{1}{w_p} \right)B = (x_w \; y_w \; z_w \; 1) \quad (4)$$

Where $B = A_{3\times4} P_{4\times4}$

Equation (4) indicates u/wp, v/wp can be interpolated linearly. For perspective-correct texture mapping, after linearly interpolating u/wp, v/wp and 1/wp, the correct texture coordinates can be computed for projective-correct texture mapping.

The algorithm for interpolating between two points is:

Input: point $(x_{1p} \; y_{1p} \; z_{1p} \; w_{1p})(x_{2p} \; y_{2p} \; z_{2p} \; w_{2p})$, Clip plane $ax_w + by_w + cz_w + d = 0$ The intersection point $(x_p \; y_p \; z_p \; w_p)$ will satisfy:

$$\begin{cases} x_w = x_p/w_p = x_{1p}/w_{1p} + (x_{2p}/w_{2p} - x_{1p}/w_{1p})t = x_{1w} + (x_{2w} - x_{1w})t \\ y_w = y_p/w_p = y_{1p}/w_{1p} + (y_{2p}/w_{2p} - y_{1p}/w_{1p})t = y_{1w} + (y_{2w} - y_{1w})t \\ z_w = z_p/w_p = z_{1p}/w_{1p} + (z_{2p}/w_{2p} - z_{1p}/w_{1p})t = z_{1w} + (z_{2w} - z_{1w})t \\ 1/w_p = 1/w_{1p} + (1/w_{2p} - 1/w_{1p})t \end{cases}$$

Take into clip plane, yields:

$$ax_{1w} + by_{1w} + cz_{1w} + d + (a(x_{2w} - x_{1w}) + b(y_{2w} - y_{1w}) + c(z_{2w} - z_{1w}))t = 0$$

$$t = \frac{-w_{2p}(ax_{1p} + by_{1p} + cz_{1p} + dw_{1p})}{w_{1p}(ax_{2p} + by_{2p} + cz_{2p}) - w_{2p}(ax_{1p} + by_{1p} + cz_{1p})}$$

Then:

$$1/w_p = 1/w_{1p} + (1/w_{2p} - 1/w_{1p})t$$

$$= \frac{1}{w_{1p}} + \frac{-(w_{1p} - w_{2p})(ax_{1p} + by_{1p} + cz_{1p} + dw_{1p})}{w_{1p}(w_{1p}(ax_{2p} + by_{2p} + cz_{2p}) - w_{2p}(ax_{1p} + by_{1p} + cz_{1p}))}$$

$$= \frac{w_{1p}(ax_{2p} + by_{2p} + cz_{2p}) - w_{2p}(ax_{1p} + by_{1p} + cz_{1p}) - (w_{1p} - w_{2p})(ax_{1p} + by_{1p} + cz_{1p} + dw_{1p})}{w_{1p}(w_{1p}(ax_{2p} + by_{2p} + cz_{2p}) - w_{2p}(ax_{1p} + by_{1p} + cz_{1p}))}$$

$$= \frac{a(x_{2p} - x_{1p}) + b(y_{2p} - y_{1p}) + c(z_{2p} - z_{1p}) + d(w_{2p} - w_{1p})}{w_{1p}(ax_{2p} + by_{2p} + cz_{2p}) - w_{2p}(ax_{1p} + by_{1p} + cz_{1p})}$$

And, $$x_w = \frac{b(x_{1p}y_{2p} - x_{2p}y_{1p}) + c(x_{1p}z_{2p} - x_{2p}z_{1p}) + d(x_{1p}w_{2p} - x_{2p}w_{1p})}{w_{1p}(ax_{2p} + by_{2p} + cz_{2p}) - w_{2p}(ax_{1p} + by_{1p} + cz_{1p})}$$

$$y_w = \frac{a(y_{1p}x_{2p} - y_{2p}x_{1p}) + c(y_{1p}z_{2p} - y_{2p}z_{1p}) + d(y_{1p}w_{2p} - y_{2p}w_{1p})}{w_{1p}(ax_{2p} + by_{2p} + cz_{2p}) - w_{2p}(ax_{1p} + by_{1p} + cz_{1p})}$$

$$z_w = \frac{a(z_{1p}x_{2p} - z_{2p}x_{1p}) + b(z_{1p}y_{2p} - z_{2p}y_{1p}) + d(z_{1p}w_{2p} - z_{2p}w_{1p})}{w_{1p}(ax_{2p} + by_{2p} + cz_{2p}) - w_{2p}(ax_{1p} + by_{1p} + cz_{1p})}$$

After NHCS transform, gives:

$$(x_{np}, y_{np}, z_{np}, w_{np}) = c_w c_v c_p w_{nm}(x_p, y_p, z_p, w_p)$$

which gives:

$$(x_{1p}, y_{1p}, z_{1p}, w_{1p}) = \frac{1}{c_1 w_{1nm}}(x_{1np}, y_{1np}, z_{1np}, w_{1np})$$

$$(x_{2p}, y_{2p}, z_{2p}, w_{2p}) = \frac{1}{c_2 w_{2nm}}(x_{2np}, y_{2np}, z_{2np}, w_{2np})$$

Thus, the final representation of $(x_w, y_w, z_w, 1/w^p)$ becomes:

$$1/w_p = \frac{c_1 w_{1nm}(ax_{2np} + by_{2np} + cz_{2np} + dw_{2np}) - c_2 w_{2nm}(ax_{1np} + by_{1np} + cz_{1np} + dw_{1np})}{w_{1np}(ax_{2np} + by_{2np} + cz_{2np}) - w_{2np}(ax_{1np} + by_{1np} + cz_{1np})}$$

$$x_w = \frac{b(x_{1np}y_{2np} - x_{2np}y_{1np}) + c(x_{1np}z_{2np} - x_{2np}z_{1np}) + d(x_{1np}w_{2np} - x_{2np}w_{1np})}{w_{1np}(ax_{2np} + by_{2np} + cz_{2np}) - w_{2np}(ax_{1np} + by_{1np} + cz_{1np})}$$

$$y_w = \frac{a(y_{1np}x_{2np} - y_{2np}x_{1np}) + c(y_{1np}z_{2np} - y_{2np}z_{1np}) + d(y_{1np}w_{2np} - y_{2np}w_{1np})}{w_{1np}(ax_{2np} + by_{2np} + cz_{2np}) - w_{2np}(ax_{1np} + by_{1np} + cz_{1np})}$$

$$z_w = \frac{a(z_{1np}x_{2np} - z_{2np}x_{1np}) + b(z_{1np}y_{2np} - z_{2np}y_{1np}) + d(z_{1np}w_{2np} - z_{2np}w_{1np})}{w_{1np}(ax_{2np} + by_{2np} + cz_{2np}) - w_{2np}(ax_{1np} + by_{1np} + cz_{1np})}$$

And the representation of $(x_p, y_p, z_p, w_p)$ $$w_p = \frac{w_{1np}(ax_{2np} + by_{2np} + cz_{2np}) - w_{2np}(ax_{1np} + by_{1np} + cz_{1np})}{c_1 w_{1nm}(ax_{2np} + by_{2np} + cz_{2np} + dw_{2np}) - c_2 w_{2nm}(ax_{1np} + by_{1np} + cz_{1np} + dw_{1np})}$$

$$x_p = \frac{b(x_{1np}y_{2np} - x_{2np}y_{1np}) + c(x_{1np}z_{2np} - x_{2np}z_{1np}) + d(x_{1np}w_{2np} - x_{2np}w_{1np})}{c_1 w_{1nm}(ax_{2np} + by_{2np} + cz_{2np} + dw_{2np}) - c_2 w_{2nm}(ax_{1np} + by_{1np} + cz_{1np} + dw_{1np})}$$

$$y_p = \frac{b(y_{1np}x_{2np} - y_{2np}x_{1np}) + c(y_{1np}z_{2np} - y_{2np}z_{1np}) + d(y_{1np}w_{2np} - y_{2np}w_{1np})}{c_1 w_{1nm}(ax_{2np} + by_{2np} + cz_{2np} + dw_{2np}) - c_2 w_{2nm}(ax_{1np} + by_{1np} + cz_{1np} + dw_{1np})}$$

$$z_p = \frac{a(z_{1np}x_{2np} - z_{2np}x_{1np}) + b(z_{1np}y_{2np} - z_{2np}y_{1np}) + d(z_{1np}w_{2np} - z_{2np}w_{1np})}{c_1 w_{1nm}(ax_{2np} + by_{2np} + cz_{2np} + dw_{2np}) - c_2 w_{2nm}(ax_{1np} + by_{1np} + cz_{1np} + dw_{1np})}$$

In case the new intersection point will participate in further clipping, it can be written in NHCS form:

$$x_{np} = b(x_{1np}y_{2np} - x_{2np}y_{1np}) + c(x_{1np}z_{2np} - x_{2np}z_{1np}) + d(x_{1np}w_{2np} - x_{2np}w_{1np})$$

$$y_{np} = a(y_{1np}y_{2np} - x_{2np}x_{1np}) + c(y_{1np}z_{2np} - y_{2np}z_{1np}) + d(y_{1np}w_{2np} - y_{2np}w_{1np})$$

$$z_{np} = a(z_{1np}x_{2np} - z_{2np}x_{1np}) + b(z_{1np}y_{2np} - z_{2np}y_{1np}) + d(z_{1np}w_{2np} - z_{2np}w_{1np})$$

$$w_{np} = w_{1np}(ax_{2np} + by_{2np} + cz_{2np}) - w_{2np}(ax_{1np} + by_{1np} + cz_{1np})$$

And $$Cw = c_1 w_{1nm}(ax_{2np} + by_{2np} + cz_{2np} + dw_{2np}) - c_2 w_{2nm}(ax_{1np} + by_{1np} + cz_{1np} + dw_{1np})$$

Here, C is the shifted bits and w is the weight, and the interpolate parameter is:

$$T_p = \frac{w_p - w_{1p}}{w_{2p} - w_{1p}}$$

$$= \frac{-c_2 w_{2nm}(ax_{1np} + by_{1np} + cz_{1np} + dw_{1np})}{c_1 w_{1nm}(ax_{2np} + by_{2np} + cz_{2np} + dw_{2np}) - c_2 w_{2nm}(ax_{1np} + by_{1np} + cz_{1np} + dw_{1np})}$$

Miscellaneous Functions

There are some functions that have not been discussed in the previous sections. These functions include: (1) NHCS functions that perform NHCS conversion; and (2) EffiDigit functions that calculates efficient digit of an integer. These functions will now be discussed.

Calculate Efficient Digits in UFIX8

| UFIX8 EffiDigit__UFIX8(UFIX8 a) | |
|---|---|
| This function calculates efficient digits in an UFIX8 integer | |
| Parameters | a |
| | Input integer, unsigned 8-bits integer in UFIX8 format |
| Return value | Efficient digit of the integer, which equals ceil($\log_2$(abs(a))) in UFIX8 format. |
| Remarks | Using Bisearch algorithm |

Calculate Efficient Digits in SFIX32

| UFIX8 EffiDigit__SFIX32(SFIX32 a) | |
|---|---|
| This function calculates efficient digits in an SFIX32 integer | |
| Parameters | a |
| | Input integer, signed 32-bits integer in SFIX32 format |
| Return value | Efficient digit of the integer, which equals ceil($\log_2$(abs(a))) in UFIX8 format. |
| Remarks | Using Bisearch algorithm |

Calculate Efficient Digits in SFIX64

| UFIX8 EffiDigit__SFIX64(SFIX64 a) | |
|---|---|
| This function calculates efficient digits in an SFIX64 integer | |
| Parameters | a |
| | Input integer, signed 64-bits integer in SFIX64 format |
| Return value | Efficient digit of the integer, which equals ceil($\log_2$(abs(a))) in UFIX8 format. |
| Remarks | Using Bisearch algorithm |

Conversion from SFIX64Quad to SFIX32Quad NHCS

| | |
|---|---|
| int NHCS_SFIX64Quad (SFIX64Quad a, SFIX32Quad b) | |
| This functions convert from non-NHCS to NHCS | |
| Parameters | a |
| | Input integers, signed 64-bits Quad, in SFIX64Quad format. |
| | b |
| | Output integers, signed 32-bits Quad, in SFIX32Quad, NHCS format. |
| Return value | An integer records shift bits from 64-bit non-NHCS to 32-bit NHCS. |
| Remarks | NHCS_SFIX64Quad is used in transform. In transform, we need not shift when efficient digits of maximum component are less than storage bits. In clip space has either NHCS or non-NHCS, For recovering the correct w, it needs to record the shift bits. |

Conversion from SFIX64Triple to SFIX16Triple NHCS

| | |
|---|---|
| Void NHCS_SFIX64Triple(SFIX64Triple a, SFIX16Triple b) | |
| This functions perform NHCS conversion | |
| Parameters | a |
| | Input integers, signed 64-bits Triple, non-NHCS |
| | b |
| | output integers, signed 16-bits Triple, NHCS |
| Return value | No return value |
| Remarks | NHCS_SFIX64Triple is used in lighting before normalization. Either efficient digit of maximum component is less than storage bits or not, we need shift to preserve precision. |

Conversion from SFIX64Triple to SFIX16Triple NHCS

| | |
|---|---|
| Void NHCS_SFIX64Triple(SFIX32Triple a, SFIX16Triple b) | |
| This functions perform NHCS conversion | |
| Parameters | a |
| | Input integers, signed 32-bits Triple, non-NHCS |
| | b |
| | output integers, signed 16-bits Triple, NHCS |
| Return value | No return value |
| Remarks | NHCS_SFIX32Triple is used in lighting before normalization. Either efficient digit of maximum component is less than storage bits or not, we need shift to preserve precision. |

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-implemented method for rendering graphics on an embedded device, comprising:
    inputting rendering data in a first format;
    converting the rendering data from the first format into a variable length fixed-point format in a normalized homogeneous coordinate system;
    processing the rendering data in the variable-length fixed-point format; and
    rendering the processed rendering data on the embedded device.

2. The computer-implemented method of claim 1, wherein processing the rendering data further comprises using a normalized homogenous coordinate system (NHCS) for vector operations on the rendering data.

3. The computer-implemented method of claim 2, wherein the first format is at least one of: (a) floating-point format; (b) fixed-point format.

4. The computer-implemented method of claim 1, further comprising creating a mathematical library for processing the rendering data in a variable-length fixed-point format.

5. The computer-implemented method of claim 4, processing the rendering data further comprises performing fixed-point mathematical operations contained in the mathematical library on the rendering data.

6. The computer-implemented method of claim 4, wherein processing the rendering data further comprises computing graphic functions contained in the mathematical library using the rendering data.

7. The computer-implemented method of claim 2, further comprising predicting a range of the processed rendering data and truncating any data outside the range.

8. The computer-implemented method of claim 1, wherein the embedded device includes a mobile computing device using Direct3D for mobile devices.

9. A computer-readable medium having computer-executable instructions for performing the computer-implemented method recited in claim 1.

10. A process for rendering graphics on an embedded computing platform, comprising:
    inputting rendering data;
    converting the rendering data into a variable-length fixed-point format including a normalized homogenous coordinate system (NHCS) for vector operations;
    defining a data structure for the converted rendering data to generate converted rendering data in a NHCS fixed-point format;
    using a fixed-point mathematical library to process the NHCS fixed-point format rendering data; and
    rendering the processed NHCS fixed-point format rendering data on the embedded computing platform.

11. The process as set forth in claim 10, wherein the fixed-point mathematical library includes mathematical operations and graphics functions in an NHCS fixed-point format.

12. The process as set forth in claim 10, further comprising predicting a range of the processed NHCS fixed-point format rendering data.

13. The process as set forth in claim 12, further comprising truncating any processed NHCS fixed-point format rendering data outside of the predicted range.

14. The process as set forth in claim 10, wherein rendering the processed NHCS fixed-point format rendering data further comprises using Direct3D mobile (D3DM).

15. The process as set forth in claim 14, wherein the Direct3D mobile (D3DM) uses the NHCS fixed-point format to represent the rendering data instead of a floating-point representation.

16. The process as set forth in claim 10, wherein inputting rendering data further comprises inputting rendering data in at least one of the following formats: (a) floating-point format; (2) fixed-point format.

17. One or more computer-readable media having computer-readable instructions thereon which, when executed by one or more processors, cause the one or more processors to implement the process of claim 10.

18. A computer-readable medium having computer-executable instructions for preparing data for rendering on a computing device, comprising:
converting the data into a variable-length fixed-point format having a normalized homogenous coordinate system (NHCS) to generate NHCS fixed-point data;
creating specialized buffers on the computing device to store the NHCS fixed-point data;
processing the NHCS fixed-point data using a mathematical library capable of computing mathematical operations and graphics functions using a NHCS fixed-point format; and
preparing the processed NHCS fixed-point data for raster by translating the NHCS fixed-point data into a language of the computing device's graphics hardware.

19. The computer-readable medium of claim 18, further comprising inputting the data in a floating-point format.

20. The computer-readable medium of claim 18, further comprising inputting the data in a fixed-point format.

21. The computer-readable medium of claim 18, wherein preparing the processed NHCS fixed-point data for raster by further comprises converting 3D coordinates of the NHCS fixed-point data into 2D screen coordinates.

22. The computer-readable medium of claim 18, further comprising using a Direct3D for mobile (D3DM) rendering standard to render the NHCS fixed-point data on the computing device, wherein the D3DM rendering standard accepts data in the NHCS fixed-point format instead of a floating-point format.

23. A method for converting a format of rendering data, comprising:
inputting the rendering data in at least one of the following formats: (a) floating-point format; (b) fixed-point format;
identifying a maximum value in the rendering data; and
normalizing remaining values in the rendering data based on the maximum value to generate the rendering data in a normalized homogenous coordinate system (NHCS) variable length fixed-point format.

24. The method as set forth in claim 23, further comprising determining a maximum fixed-point buffer size of a destination buffer.

25. The method as set forth in claim 24, further comprising scaling the maximum value to the maximum fixed-point buffer size.

26. The method as set forth in claim 25, further comprising recording a shift digit value used in the scaling.

27. The method as set forth in claim 26, wherein normalizing further comprising using the shift digit to normalize the remaining values.

28. A graphics rendering system for an embedded computing device, comprising:
a task module that inputs raw rendering data in a first format and converts the raw rendering data into a second format that is a variable-length fixed-point format in a normalized homogeneous coordinate system;
an application programming interface (API) module that creates buffers for storing the converted rendering data;
a driver module that processes the converted rendering data to prepare the converted rendering data for rendering; and
a rendering engine that renders the processed rendering data on the embedded computing device.

29. The graphics rendering system as set forth in claim 28, wherein the variable-length fixed-point format is a normalized homogenous coordinate system (NHCS) such that the rendering data is in a NHCS fixed-point format.

30. The graphics rendering system as set forth in claim 29, wherein the first format is at least one of: (a) floating-point format; (b) fixed-point format.

31. The graphics rendering system as set forth in claim 28, wherein the task module further comprises a math library and translator that converts the raw rendering data and performs preliminary mathematical operations on the raw rendering data.

32. The graphics rendering system as set forth in claim 28, wherein the API module further comprises an index buffer that stores indices.

33. The graphics rendering system as set forth in claim 28, wherein the API module further comprises a vertex buffer that stores vertex information.

34. The graphics rendering system as set forth in claim 28, wherein the API module further comprises a wrapper that packages commands and provides convenience, compatibility and security for the commands.

35. The graphics rendering system as set forth in claim 34, wherein the API module further comprises a command buffer that stores the wrapper.

36. The graphics rendering system as set forth in claim 28, wherein the task module further comprises a transform and lighting module that prepares the converted rendering data for a rasterizer.

37. The graphics rendering system as set forth in claim 36, wherein the transform and lighting module further comprises a fixed-point mathematical library that processes the converted rendering data in a fixed-point format.

* * * * *